US008562784B2

(12) United States Patent
Park et al.

(10) Patent No.: US 8,562,784 B2
(45) **Date of Patent: *Oct. 22, 2013**

(54) AUTOMATIC SPACERS MOUNTING SYSTEM FOR FIELD EMISSION DISPLAY AND METHOD OF AUTOMATICALLY MOUNTING SPACERS

(75) Inventors: Kyung-do Park, Hwaseong-si (KR); Jin-uk Hong, Hwaseong-si (KR); Kyu-ho Kim, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 13/290,417

(22) Filed: Nov. 7, 2011

(65) Prior Publication Data

US 2012/0180951 A1 Jul. 19, 2012

(30) Foreign Application Priority Data

Jan. 17, 2011 (KR) ........................ 10-2011-0004691

(51) Int. Cl.
*B32B 37/12* (2006.01)

(52) U.S. Cl.
USPC ................ 156/297; 156/539; 445/24; 445/66

(58) Field of Classification Search
USPC .............. 156/297, 539; 445/24, 66; 44/24, 66
See application file for complete search history.

(56) References Cited

U.S. PATENT DOCUMENTS

| | | | | |
|---|---|---|---|---|
| 5,337,893 | A * | 8/1994 | Nami et al. | 206/722 |
| 5,383,997 | A * | 1/1995 | Minowa et al. | 156/235 |
| 5,561,343 | A | 10/1996 | Lowe | |
| 5,789,857 | A | 8/1998 | Yamaura et al. | |
| 5,984,079 | A * | 11/1999 | Garcia | 198/397.02 |
| 6,068,532 | A * | 5/2000 | Lai et al. | 445/24 |
| 6,119,927 | A * | 9/2000 | Ramos et al. | 228/254 |
| 6,220,913 | B1 | 4/2001 | Makita et al. | |
| 8,152,582 | B2 * | 4/2012 | Nagasaka et al. | 445/24 |
| 2006/0005380 | A1 | 1/2006 | Yang | |
| 2007/0044908 | A1 * | 3/2007 | Chan et al. | 156/297 |

OTHER PUBLICATIONS

Communication issued Jul. 11, 2012 by the European Patent Office in counterpart European Application No. 11185270.3.

* cited by examiner

*Primary Examiner* — Katarzyna Wyrozebski Lee
*Assistant Examiner* — John Blades
(74) *Attorney, Agent, or Firm* — Sughrue Mion, PLLC

(57) ABSTRACT

An automatic spacers mounting system is provided which comprises a horizontal arraying device; a vertical arraying device comprising a vertical arraying pallet and a reversing device; a mounting base which fixes the vertical arraying pallet and a panel; a vacuum absorbing device to absorb a plurality of spacers vertically arrayed in the vertical arraying pallet; a guiding and pressing device which guides a plurality of spacers from the vacuum absorbing device to the panel and a pressing plate that presses the plurality of spacers. A first loader allows the vacuum absorbing device to move from the vertical arraying pallet to above the panel, and a second loader allows the guiding and pressing device to move above the panel. A controller controls the vertical arraying device, the vacuum absorbing device, the guiding and pressing device, and the first and second loaders to mount the plurality of spacers on the panel.

21 Claims, 24 Drawing Sheets

AUTOMATIC SPACERS MOUNTING SYSTEM FOR FIELD EMISSION DISPLAY AND METHOD OF AUTOMATICALLY MOUNTING SPACERS

CROSS-REFERENCE TO RELATED APPLICATIONS

This application claims priority from 35 U.S.C. §119(a) from Korean Patent Application No. 2011-0004691 filed Jan. 17, 2011 in the Korean Intellectual Property Office, the disclosure of which is incorporated herein by reference in its entirety.

BACKGROUND

1. Field

Methods and apparatuses consistent with the exemplary embodiments relate to a field emission display. More particularly, the exemplary embodiments relate to an automatic spacers mounting system capable of automatically mounting spacers on a panel of a field emission display.

2. Description of the Related Art

Generally, a field emission display (FED) has a top panel and a bottom panel that are spaced apart from each other and a space between the top and bottom panels is sealed in a vacuum. Therefore, a lot of spaces are used to uniformly maintain a gap between the top and bottom panels in a vacuum.

40-inch or larger field emission displays use more than 1000 pieces of spacers to realize a structural stability and product characteristics in a vacuum.

Methods of mounting spacers on the field emission display may include a method in which a worker mounts spacers on the field emission display by using tweezers. This method is tedious and has a low yield of the process.

Another method is used in which a plurality of spacers are picked and placed by a chuck. Generally, when L×M pieces of spacers are mounted on the panel of the field emission display, the method is configured so that L pieces of spacers are mounted on the panel in M times. For this, a plurality of spacers are set in a vertical position one by one using a bowl feeder and a linear feeder, and a gripper is used to pick and place some spacers to mount them on the panel of the field emission display. However, since the number of spacers that can be picked and placed by the gripper in the same time is small, this method takes a long time. Also, if the spacer has a high aspect ratio, it is difficult to perform a fast mounting of the spacers.

SUMMARY

The exemplary embodiments have been developed in order to overcome the above drawbacks and other problems associated with the related art arrangement. An aspect of the exemplary embodiments relates to an automatic spacers mounting system for a field emission display capable of mounting a plurality of spacers having a high aspect ratio on a panel in high speed and a mounting method using the same.

The above aspects and/or other features can substantially be achieved by providing an automatic spacers mounting system, which includes a horizontal arraying device to array a plurality of spacers in a horizontal arraying pallet in a horizontal direction; a vertical arraying device comprising a vertical arraying pallet and a reversing device, the reversing device vertically arrays the plurality of spacers horizontally arrayed in the horizontal arraying pallet in the vertical arraying pallet; a mounting base, to which the vertical arraying pallet and a panel on which glue is sprayed are fixed; a vacuum absorbing device to absorb by a vacuum the plurality of spacers vertically arrayed in the vertical arraying pallet fixed to the mounting base; a guiding and pressing device comprising a guiding plate that guides the plurality of spacers which fall from the vacuum absorbing device to the panel and a pressing plate that presses the plurality of spacers; a first loader disposed on the mounting base and allowing the vacuum absorbing device to move from the vertical arraying pallet to above the panel; a second loader disposed on the mounting base and allowing the guiding and pressing device to move above the panel; and a controller to control the vertical arraying device, the vacuum absorbing device, the guiding and pressing device, the first loader and the second loader to mount the plurality of spacers on the panel.

The automatic spacers mounting system may include a pallet loader disposed between the horizontal arraying device and the vertical arraying device and moving a gripper which grips the horizontal arraying pallet from the horizontal arraying device to the vertical arraying device.

The reversing device may include a posture changing pallet and an open-close shutter disposed to be layered, the reversing device may couple the horizontal arraying pallet in a state that the posture changing pallet faces the horizontal arraying pallet, and the reversing device may be formed to rotate by 180 degrees with the coupled horizontal arraying pallet.

The reversing device may include a reversing frame in which the posture changing pallet and the open-close shutter are layered; and a rotating unit to rotate the reversing frame.

The reversing frame may include pallet fixing portions to fix the horizontal arraying pallet to the posture changing pallet and a shutter driving portion to move the open-close shutter with respect to the posture changing pallet.

The reversing frame may include a posture changing shutter disposed between the posture changing pallet and the horizontal arraying pallet; and a posture changing shutter driving portion moving the posture changing shutter with respect to the posture changing shutter.

The posture changing pallet may include a plurality of posture changing holes. Each of the posture changing holes may include an inlet portion corresponding to the spacer in a horizontal state, an outlet portion corresponding to the spacer in a vertical state and a curve portion connecting the inlet portion and the outlet portion to guide the spacer from the horizontal state to the vertical state.

The open-close shutter may include a plurality of blocking portions formed to correspond to the outlet portions of the plurality of posture changing holes of the posture changing pallet and a plurality of through holes formed in a side of each of the plurality of blocking portions, the plurality of through holes through which the spacer discharged from the outlet portion passes. According to a signal form the controller, the blocking portion or the through hole may be located below the outlet portion of the posture changing hole.

The automatic spacers mounting system may include a pallet carrying apparatus disposed between the horizontal arraying pallet and the mounting base, and carries the vertical arraying pallet to the vertical arraying device and the mounting base.

The vacuum absorbing device may be formed to absorb, at the same time, several pieces of spacers among the plurality of spacers vertically arrayed in the vertical arraying pallet. Each of the plurality of pressing pins may be formed as a spring pin.

The vacuum absorbing device may absorb, at the same time, ⅓ pieces of all spacers arrayed in the vertical arraying pallet.

The guiding and pressing device may include a vacuum absorbing device receiving space, in which the vacuum absorbing device can be located above the guiding plate and below the pressing plate.

The horizontal arraying device may be formed to allow the horizontal arraying pallet to perform a seesaw motion and to apply vibration to the horizontal arraying pallet.

The horizontal arraying pallet may include a plurality of elongate grooves corresponding to the number of all spacers that will be mounted on the panel.

The automatic spacers mounting system may include a glue dispensing apparatus disposed in a side of the mounting base to spray glue at a plurality of positions of the panel on which the plurality of spacers will be mounted.

The glue dispensing apparatus may include a panel centering unit fixing the panel.

According to another aspect of the exemplary embodiments, a method of automatically mounting spacers may include spraying glue at a plurality of positions of a panel on which a plurality of spacers will be mounted; loading the panel with sprayed glue to a mounting base of a spacers mounting apparatus; arraying the plurality of spacers in a horizontal arraying pallet in a horizontal direction using a horizontal arraying device; coupling the horizontal arraying pallet to a reversing device and rotating the reversing device by 180 degrees so that the plurality of spacers is arrayed in a vertical direction; moving the reversing device above the vertical arraying pallet to drop the plurality of spacers into vertical grooves of the vertical arraying pallet; loading the vertical arraying pallet to the mounting base; placing the guiding and pressing device above the panel loaded to the mounting base; allowing the vacuum absorbing device to absorb the plurality of spacers in the vertical arraying pallet and to place in the vacuum absorbing device receiving portion of the guiding and pressing device; allowing the vacuum absorbing device to drop the plurality of spacers into the plurality of guiding holes of the guiding and pressing device so that the spacers dropped in the plurality of guiding holes contact the glue of the panel; allowing the vacuum absorbing device to get out of the vacuum absorbing device receiving space and moving the pressing plate to press the spacers inserted into the plurality of guiding holes; and unloading the panel after separating the guiding and pressing device from the panel The spraying glue at a plurality of positions of a panel on which a plurality of spacers is mounted and the arraying the plurality of spacers in a horizontal arraying pallet in a horizontal direction using a horizontal arraying device may be simultaneously performed.

When the reversing device rotates the horizontal arraying pallet by 180 degrees, posture of each of the spacers may be changed from a horizontal state to a vertical state while the spacers pass through a plurality of posture changing holes of the posture changing pallet.

The moving the reversing device above the vertical arraying pallet may include placing the reversing device in order from a first part to a fourth part among the four equal parts of the vertical arraying pallet.

The placing the guiding and pressing device above the panel loaded to the mounting base may include placing the guiding and pressing device in order at from a first part to a third part among the three equal parts of the panel.

Other objects, advantages and salient features of the exemplary embodiments will become apparent from the following detailed description, which, taken in conjunction with the annexed drawings, discloses exemplary embodiments.

BRIEF DESCRIPTION OF THE DRAWINGS

These and/or other aspects and advantages will become apparent and more readily appreciated from the following description of the exemplary embodiments, taken in conjunction with the accompanying drawings of which.

Throughout the drawings, like reference numerals will be understood to refer to like parts, components and structures.

DETAILED DESCRIPTION OF THE EXEMPLARY EMBODIMENTS

Hereinafter, certain exemplary embodiments will be described in detail with reference to the accompanying drawings.

The matters defined in the description, such as a detailed construction and elements thereof, are provided to assist in a comprehensive understanding of the exemplary embodiments. Thus, it is apparent that the exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding of the exemplary embodiments.

Figure 1:
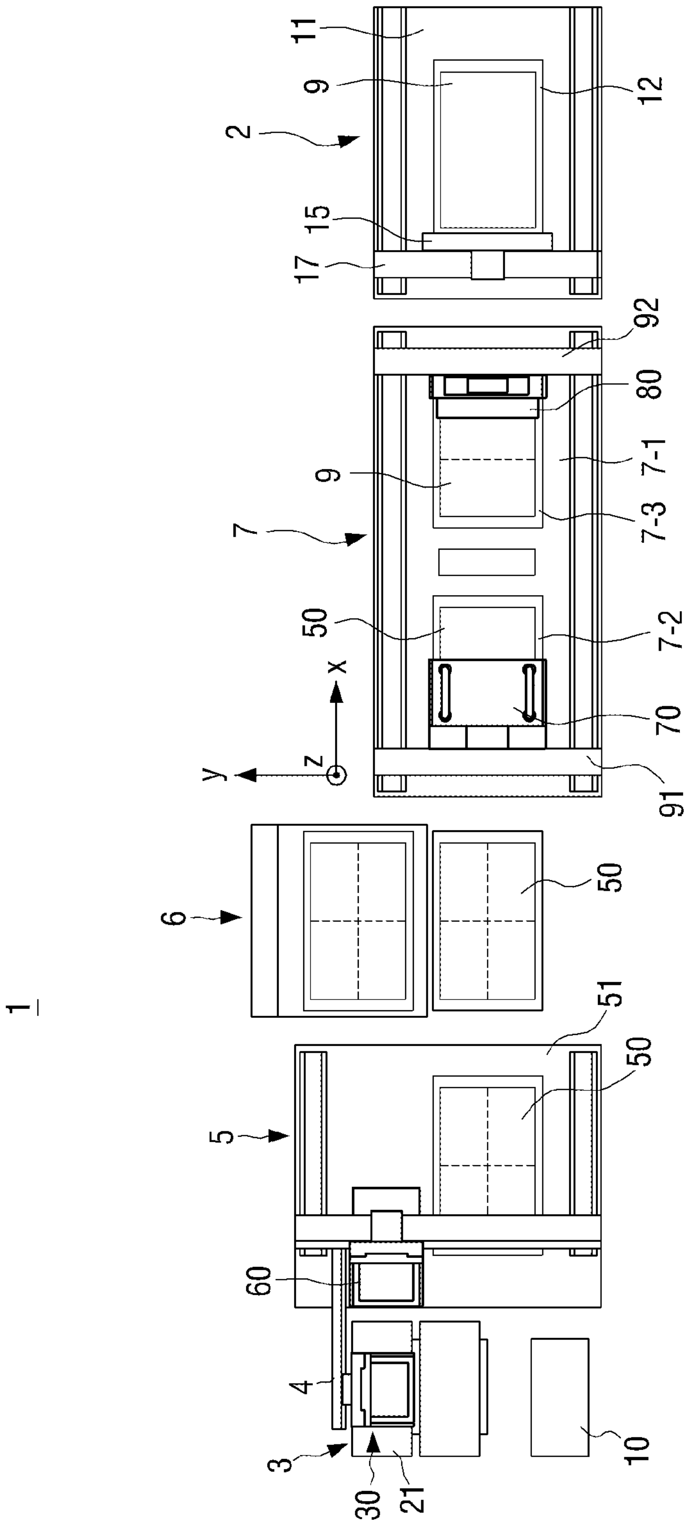
FIG. 1 is a layout schematically illustrating an automatic spacers mounting system according to an exemplary embodiment.
Figure 2:
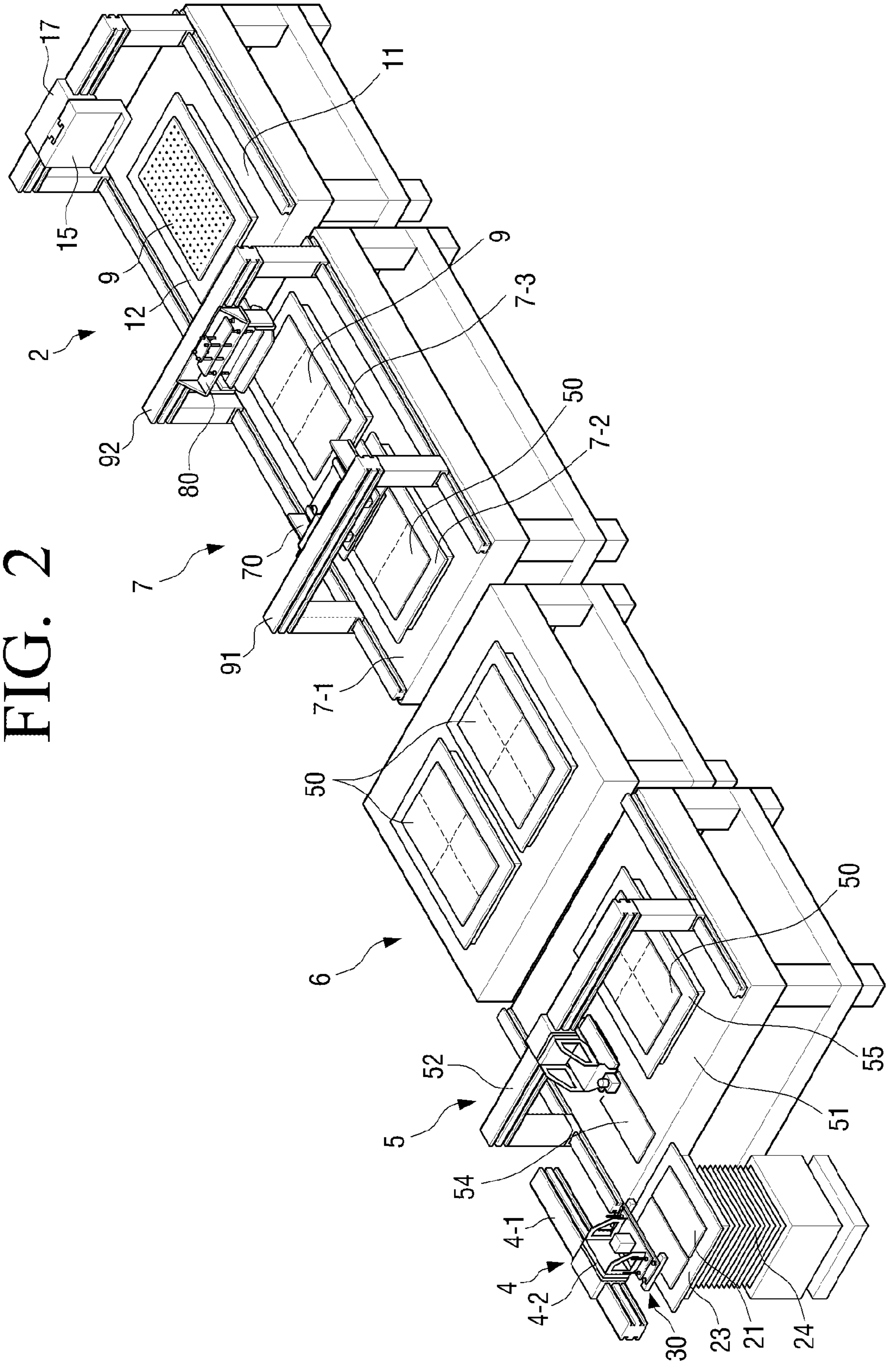
FIG. 2 is a perspective view schematically illustrating the automatic spacers mounting system of FIG. 1.
Figure 3:
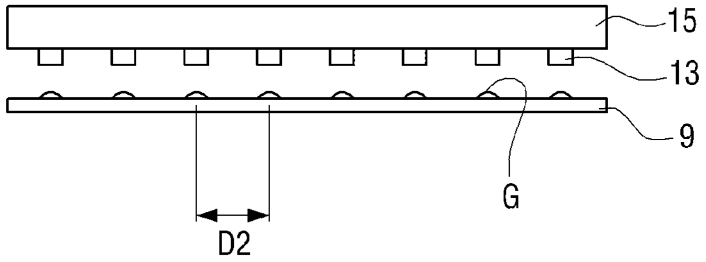
FIG. 3 is a view conceptually illustrating a state in which a glue dispensing apparatus of FIG. 2 sprays glue on a panel.

FIG. 1 is a layout schematically illustrating an automatic spacers mounting system according to an exemplary embodiment, and FIG. 2 is a perspective view schematically illustrating the automatic spacers mounting system of FIG. 1. FIG. 3 is a view conceptually illustrating a state in that a glue dispensing apparatus of FIG. 2 sprays glue on a panel.

The automatic spacers mounting system 1 according to an exemplary embodiment is an apparatus that automatically mounts a lot of spacers on a panel of a field emission display (FED), and as illustrated in FIGS. 1 and 2, may include a glue dispensing apparatus 2, a horizontal arraying device 3, a pallet loader 4, a vertical arraying device 5, a pallet carrying apparatus 6, a spacers mounting apparatus 7 and a controller 10.

Figure 34:
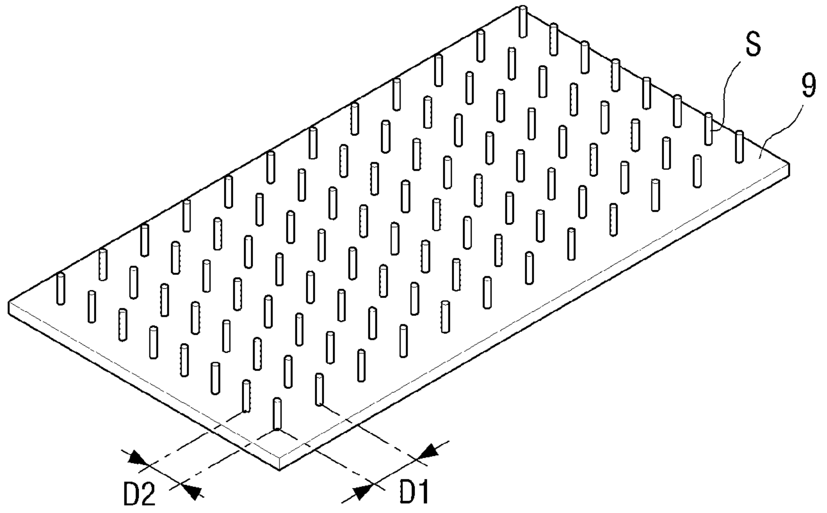
FIG. 34 is a perspective view conceptually illustrating a panel on which mounting spacers is completed.
Figure 35:
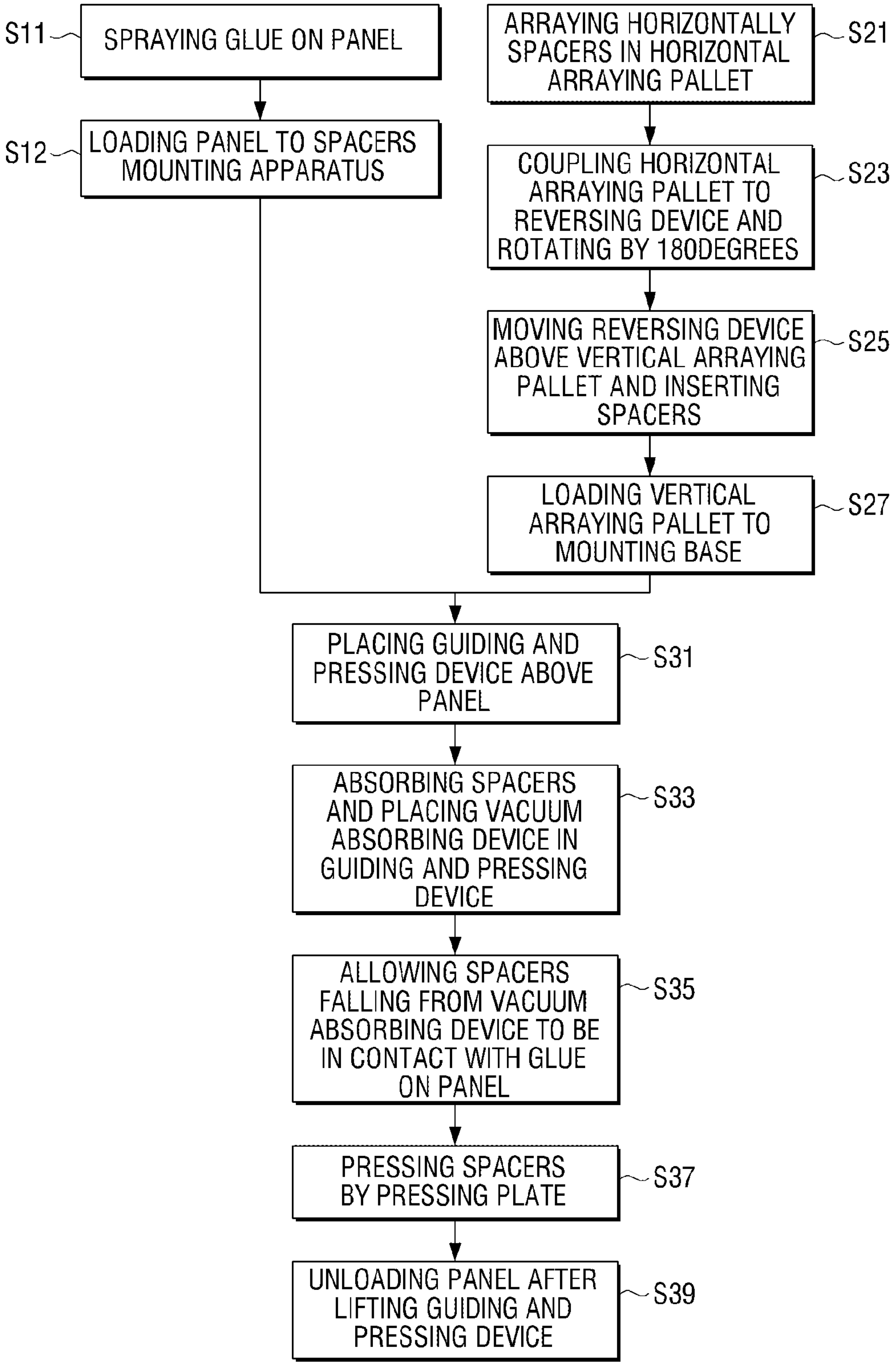
FIG. 35 is a flow chart illustrating a method of automatically mounting spacers according to an exemplary embodiment.

The glue dispensing apparatus 2 is an apparatus that sprays a predetermined amount of glue at a plurality of positions at which the spacers will be mounted on the panel of the field emission display. In case of a 46-inch panel, 1176 pieces of spacers are mounted on a surface of the panel. Here, to mount spacers S (see FIG. 6) on the panel 9 means to fix, vertically, the spacers S on the panel as illustrated in FIG. 34.

Referring to FIG. 2, the glue dispensing apparatus 2 may include a base 11, an adhesive head 15 on which a plurality of glue guns 13 (see FIG. 3) are disposed, and a gun moving unit 17 to allow the adhesive head 15 to move with respect to the base 11.

The panel 9 is loaded on the base 11 of the glue dispensing apparatus 2. In the base 11 may be disposed a panel centering unit 12 allowing the panel 9 to be positioned at a correct position and to be fixed. Although not illustrated, a panel loading unit may be formed to automatically load and unload the panel 9 to and from the base 11 of the glue dispensing apparatus 2. The plurality of glue guns 13 are disposed at predetermined intervals on the adhesive head 15.

FIG. 2 illustrates the glue dispensing apparatus 2 having eight glue guns 13. However, this is only exemplary. The number of the glue guns 13 may be determined to correspond to the number of spacers S that will be mounted on the panel 9. For example, when spacers S are arranged by L×M on the panel 9, L pieces of the glue guns 13 may be disposed on the adhesive head 15 to spray glue at the same time at L pieces of positions on the panel 9. Intervals between the plurality of glue guns 13 may be determined by multiple of a pitch D2 between the plurality of spacers S that will be mounted on the panel 9 as illustrated in FIG. 3. The gun moving unit 17 is formed to move the adhesive head 15 in one direction, namely, in an X direction with respect to the base 11. The plurality of glue guns 13 are upwardly spaced apart at a predetermined distance from the panel 9 and can spray a predetermined amount of glue in a dot on the panel 9. The amount of glue sprayed by the glue gun 13 is properly determined to fix the spacer S on the panel 9.

Figure 4:
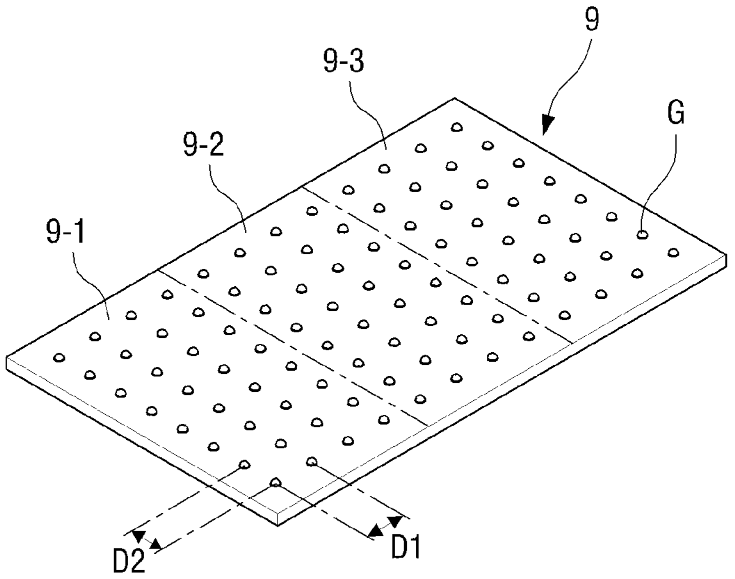
FIG. 4 is a perspective view illustrating a panel on which glue is sprayed at a predetermined interval by a glue dispensing apparatus of FIG. 2.

The glue dispensing apparatus 2 uses non-contact type jet dispensing and dotting on the fly during movement of the gun moving unit 17. With this method, the adhesive head 15 can spray a proper amount of glue G without stopping during movement of the gun moving unit 17, and form a dot having a proper size on the panel 9. Accordingly, when mounting the spacers S by an array of L×M, the adhesive head 15 sprays, at the same time, glue at L pieces of positions of the panel 9 while the gun moving unit moves at a constant speed in a moving direction and repeats this operation M times. Then, as illustrated in FIG. 4, the sprayed glue forms a plurality of glue dots G on a top surface of the panel 9. The plurality of glue dots G are formed at the same intervals D1 and D2 as the pitches of the spacers S that will be mounted on the panel in the X and Y directions. In FIG. 4, for convenience, some glue dots G only are depicted in an enlarged manner. In fact, 1176 pieces of spacer dots G are formed on 46-inch panel 9. The plurality of glue guns 13 may be controlled by a trigger signal. For compensating spraying positions of glue a measurement device also may be disposed and the glue dispensing apparatus 2 can compensate the spraying positions of glue by using a measuring result of the measurement device. The panel 9 on which the spraying of the glue G is completed by the glue dispensing apparatus 2 is loaded to the spacers mounting apparatus 7.

Figure 5:
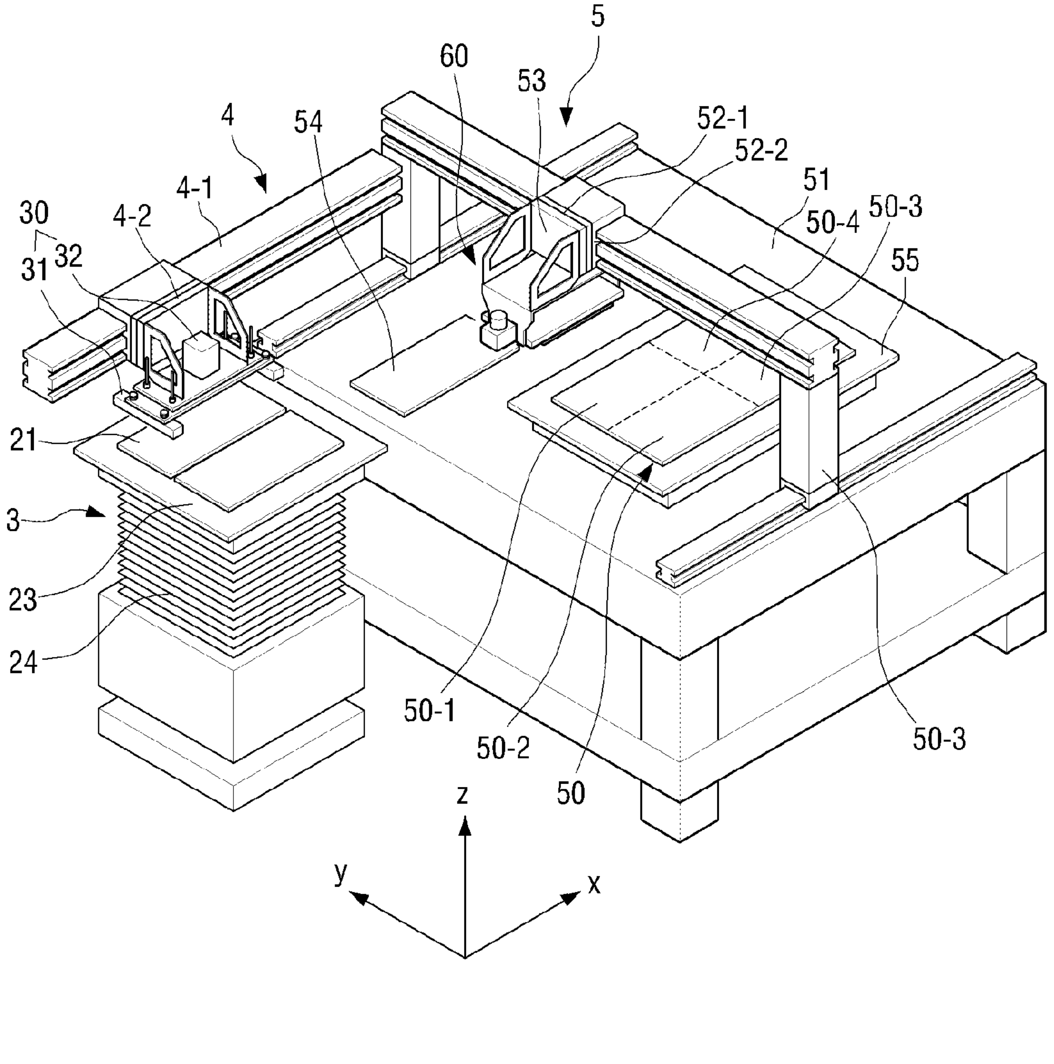
FIG. 5 is a perspective view schematically illustrating a horizontal arraying device and a vertical arraying device of the automatic spacers mounting system of FIG. 2.
Figure 6:
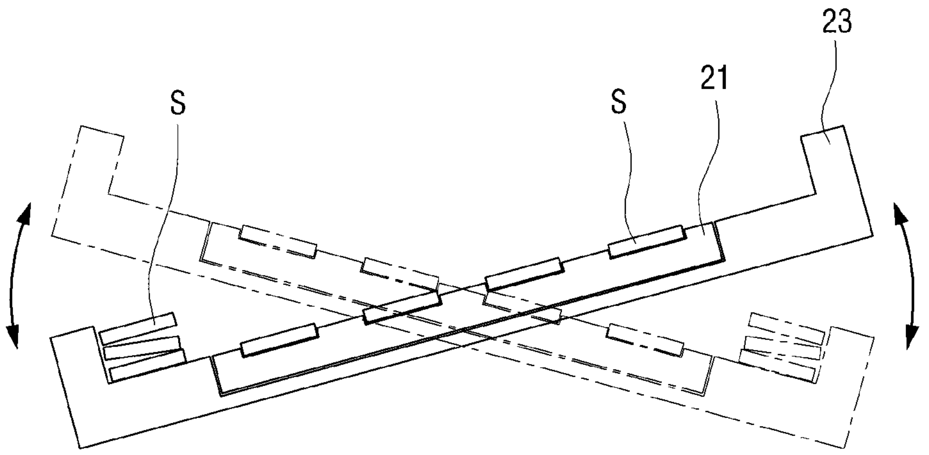
FIG. 6 is a view conceptually illustrating a state in which the horizontal arraying device of FIG. 5 arrays horizontally spacers.

FIG. 5 is a perspective view schematically illustrating the horizontal arraying device 3 and the vertical arraying device 5 of the automatic spacers mounting system 1 of FIG. 2. FIG. 6 is a view conceptually illustrating a state in which the horizontal arraying device 3 of FIG. 5 horizontally arrays the spacers.

The horizontal arraying device 3 is an apparatus that allows the plurality of spacers S to be arrayed in a horizontal direction in a horizontal arraying pallet 21. Referring to FIG. 5, the horizontal arraying device 20 includes a seesaw table 23 and an operating portion 24. On the seesaw table 23 is detachably mounted two horizontal arraying pallets 21. The operating portion 24 drives the seesaw table 23 to perform a seesaw motion as illustrated in FIG. 6. Also, the operating portion 24 can apply vibration of a predetermined frequency to the seesaw table 23. Therefore, the horizontal arraying pallet 21 mounted on the seesaw table 23 can perform a seesaw motion, and simultaneously vibrate in a predetermined frequency.

Figure 10A:
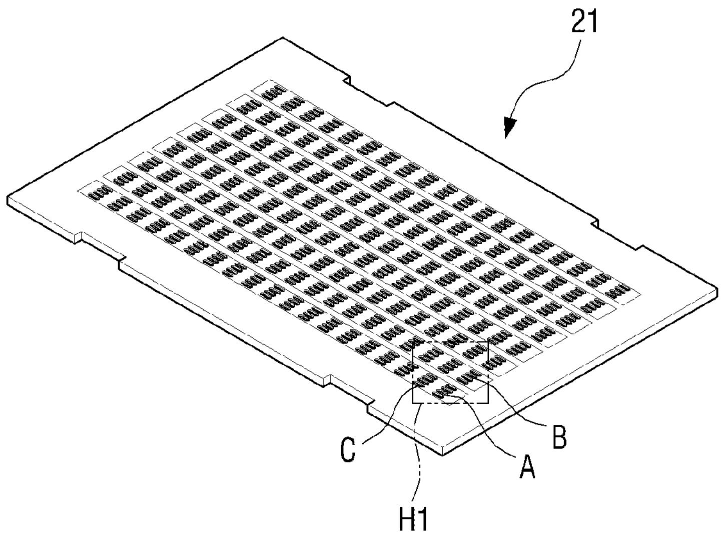
FIG. 10A is a perspective view illustrating the horizontal arraying pallet of FIG. 9.
Figure 10B:
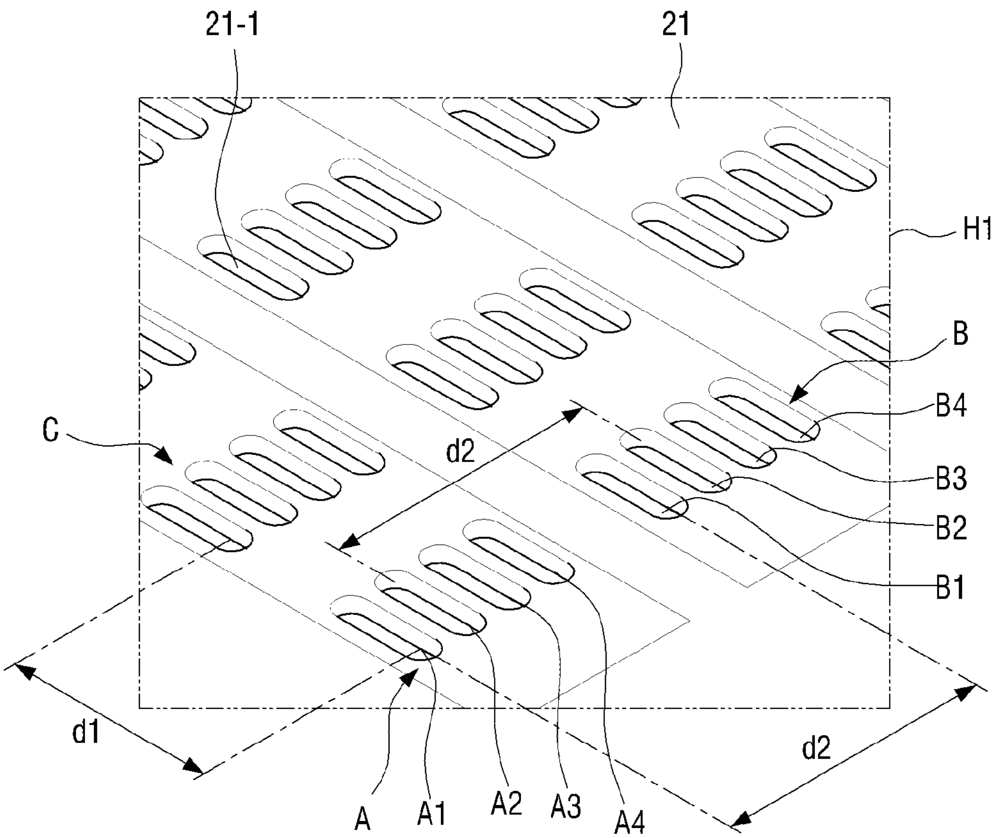
FIG. 10B is an enlarged perspective view illustrating a portion H1 of FIG. 10A.

One example of the horizontal arraying pallet 21 is illustrated in FIG. 10*a*. The horizontal arraying pallet 21 has a plurality of elongate grooves 21-1 in which the spacer S can be received in a horizontal state. In this exemplary embodiment, the horizontal arraying pallet 21 has the number of elongate grooves 21-1 corresponding to the number of spacers S in order to receive all pieces of spacers S required for the panel 9. For example, since if the panel 9 is a 46-inch panel, the panel 9 needs 1176 pieces of spacers S, 1176 pieces of elongate grooves 21-1 are formed on the horizontal arraying pallet 21. Also, when the spacer S has a cylindrical shape, the elongate grooves 21-1 may be formed to have a cross-section corresponding to the shape of the spacer S. The plurality of elongate grooves 21-1 are configured so that four elongate grooves 21-1 forms one group. The four elongate grooves 21-1 of each of two nearby groups have the same interval as the pitch of plurality of spacers S that will be mounted on the panel 9. In other words, referring to an enlarged view of a portion H1 illustrated in FIG. 10*b*, an interval d2 between a first elongate groove A1 among four elongate grooves A1-A4 of group "A" and a first elongate groove B1 among four elongate grooves B1-B4 of group "B" is formed to have the same size as that of a spacer pitch D2. In the same manner, interval d2 between each of second, third, and fourth elongate grooves A2, A3 and A4 of the group "A" and each of second, third, and fourth elongate grooves B2, B3 and B4 of the group "B" are the same size as that of the spacer pitch D2. Also, interval d1 between the "A" group and a "C" group perpendicular to the "B" group is the same size as that of a spacer pitch D1 in a corresponding direction. Here, the spacer pitch means intervals D1 and D2 (see FIG. 34) between the spacers S in two directions (X and Y directions) that are perpendicular to each other when the spacers S are mounted on the panel 9. Also, the number of elongate groove groups "A", "B", and "C", formed on the horizontal arraying pallet 21, is ¼ of the all pieces of spacers S. Therefore, the horizontal arraying pallet 21 on which the elongated groove groups "A", "B" and "C" are formed has an area corresponding to ¼ of an area of the panel 9.

The pallet loader 4 may be disposed in a side of the horizontal arraying device 3. The pallet loader 4 carries the horizontal arraying pallet 21 on which the spacers S are received to a pallet loading portion 54 of the vertical arraying device 5. The pallet loader 4 may be formed as a one-axis Cartesian coordinate robot. Therefore, the pallet loader 4 may include a straight moving guide 4-1 extending in the X direction and a moving portion 4-2 moving along the straight moving guide 4-1. A gripper 30 is disposed on the moving portion 4-2 of the pallet loader 4. The gripper 30 includes two gripping portions 31 that can grip the horizontal arraying pallet 21 and a lifting unit 32 that can move up and down the gripping portions 31 in a vertical direction. Therefore, after placing the gripper 30 fixed on the moving portion 4-2 of the pallet loader 4 above the horizontal arraying pallet 21, the gripping portions 31 are lowered to grip the horizontal arraying pallet 21. Then, after lifting the gripping portions 31 of the gripper 30, the pallet loader 4 moves the gripper 30 to place the horizontal arraying pallet 21 at the pallet loading portion 54 of the vertical arraying device 5.

Referring to FIG. 5, the vertical arraying device 5 is disposed at a side of the horizontal arraying device 3. The vertical arraying device 5 may include an arraying base 51, an arraying loader 52, a reversing device 60, and a vertical arraying pallet 50.

The arraying base 51 supports the vertical arraying pallet 50 and may include a pallet centering unit 55 for positioning the vertical arraying pallet 50. Also, the arraying base 51 supports the arraying loader 52 so that the arraying loader 52 carries the reversing device 60 above the vertical arraying pallet 50. The pallet loading portion 54 on which the horizontal arraying pallet 21 is placed is provided at a side of the arraying base 51.

The arraying loader 52 allows the reversing device 60 to move to any position above the arraying base 51 and may be formed as a three-axis Cartesian coordinate robot. In other words, the arraying loader 52 may include a Z-axis portion 52-1 moving a moving plate 53 on which the reversing device 60 is fixed in a vertical direction with respect to the arraying base 51, a Y-axis portion 52-2 moving the Z-axis portion 52-1 in the Y direction, and an X-axis portion 52-3 moving the Y-axis portion 52-2 in the X direction. Therefore, the arraying loader 52 moves the reversing device 60 disposed on the moving plate 53 to the pallet loading portion 54, and allows the reversing device 60 to couple the horizontal arraying pallet 21. Also, the arraying loader 52 moves the reversing device 60 with the coupled horizontal arraying pallet 21 above the vertical arraying pallet 50 and then allows the plurality of spacers S to be inserted into vertical grooves 50*a* of the vertical arraying pallet 50.

Figure 7:
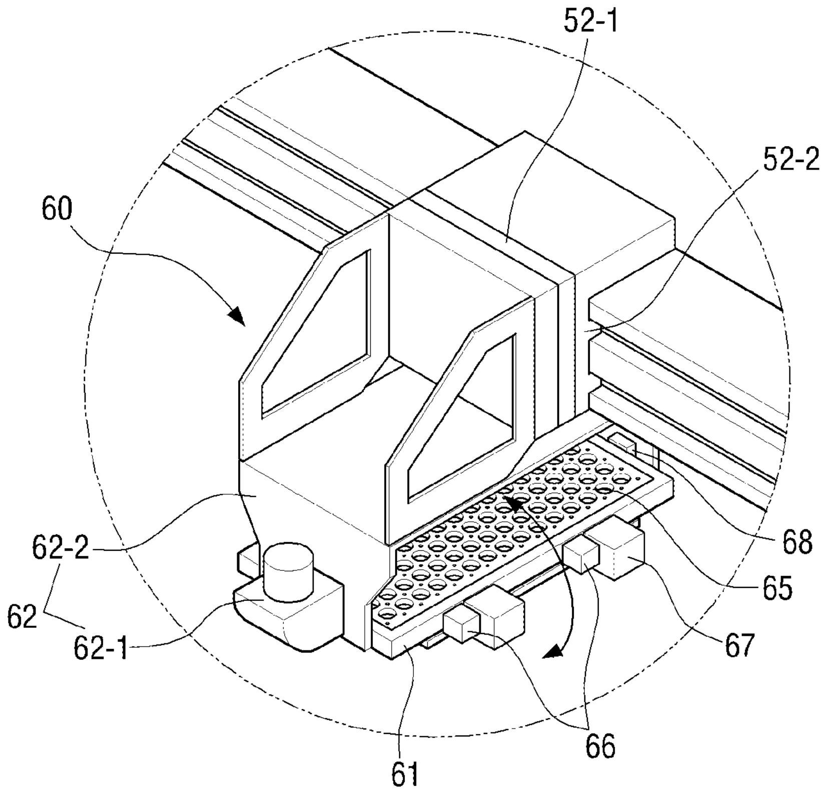
FIG. 7 is a perspective view schematically illustrating a reversing device of the vertical arraying device of FIG. 5.

FIG. 7 is a perspective view schematically illustrating the reversing device 60 of the vertical arraying device 5 of FIG. 5. The reversing device 60 is an apparatus that allows the plurality of spacers S arrayed horizontally on the horizontal arraying pallet 21 to be arrayed vertically and inserts the vertically arrayed spacers S into the vertical grooves 50*a* of the vertical arraying pallet 50.

Figure 11A:
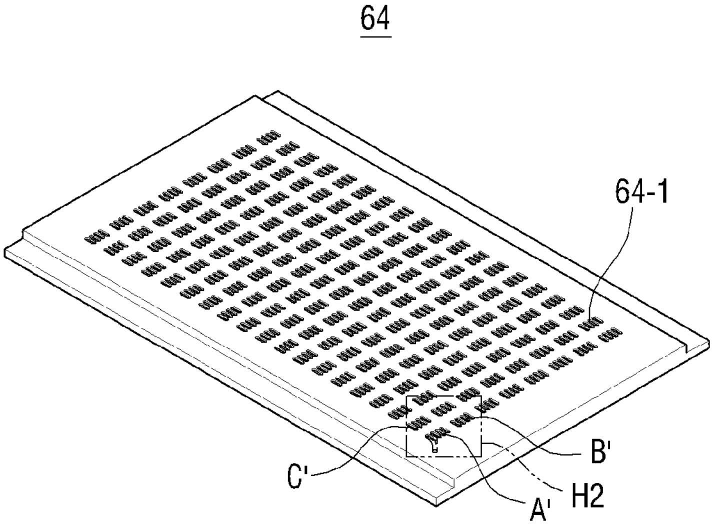
FIG. 11A is a perspective view illustrating a posture changing pallet of FIG. 9.
Figure 11B:
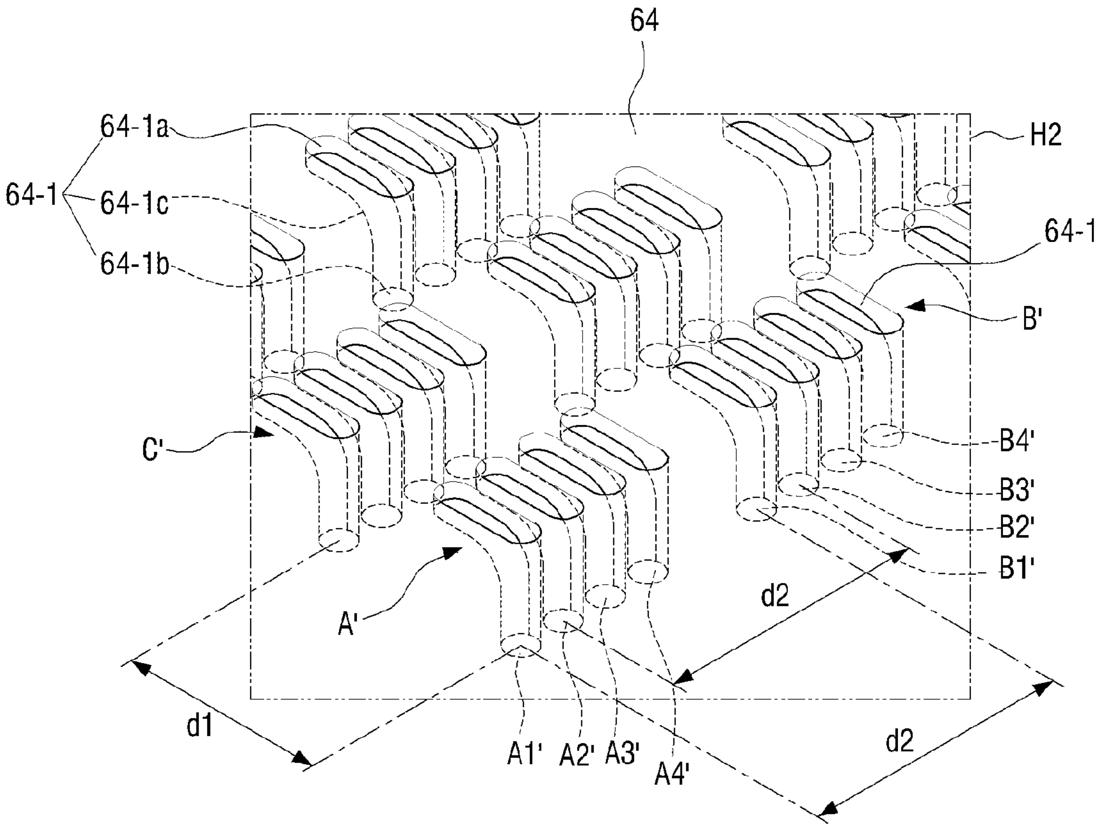
FIG. 11B is an enlarged perspective view illustrating a portion H2 of FIG. 11A.

Referring to FIG. 7, the reversing device 60 includes a reversing frame 61 and a rotating unit 62. The reversing frame 61 holds a posture changing shutter 63 (FIG. 8), a posture changing pallet 64 and an open-close shutter 65 in a layered state. The posture changing pallet 64 has a size corresponding to the size of the horizontal arraying pallet 21, and has a plurality of posture changing holes 64-1 as illustrated in FIGS. 11a and 11b. The number of elongate grooves 21-1 formed on the horizontal arraying pallet 21 is the same as the number of the posture changing holes 64-1 formed on the posture changing pallet 64. In other words, on the posture changing pallet 64 are formed posture changing hole groups "A", "B" and "C" that includes four posture changing holes A1'-A4' to correspond to the elongate groove groups "A", "B" and "C" of the horizontal arraying pallet 21. Therefore, the elongate grooves 21-1 of the horizontal arraying pallet 21 and the posture changing holes 64-1 of the posture changing pallet 64 correspond one to one.

Figure 18:
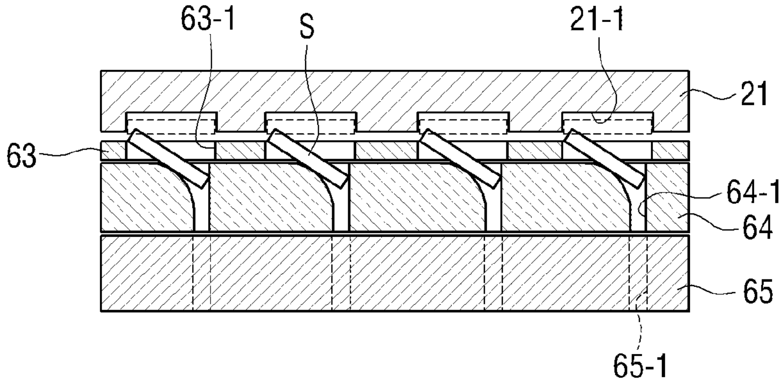
FIG. 18 is a partially sectional view conceptually illustrating a state in which the revering device of FIG. 17 is rotated by 180 degrees.

The posture changing holes 64-1, as illustrated in FIG. 18, allows the spacers S arrayed horizontally in the elongate grooves 21-1 of the horizontal arraying pallet 21 to be arrayed in a vertical direction. The posture changing holes 64-1, as illustrated in FIGS. 11b and 18, are configured to include an inlet portion 64-1a that corresponds to the spacer S in a horizontal state to receive the spacer S in a horizontal state, an outlet portion 64-1b formed in a circular shape having an inner diameter through which the spacer S can pass to correspond to the spacer S in a vertical state and a curve portion 64-1c that connects the inlet portion 64-1a and the outlet portion 64-1b and guides the spacer S to change its posture from a horizontal state to a vertical state. The curve portion 64-1c is formed in a proper curvature to erect the spacer S falling from the horizontal state into a vertical state. Therefore, when the reversing device 60 rotates by 180 degrees, the spacers S received horizontally in the elongate grooves 21-1 of the horizontal arraying pallet 21 are erected in a vertical state while passing through the posture changing holes 64-1.

Figure 8:
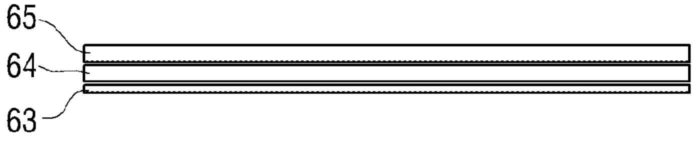
FIG. 8 is a sectional view conceptually illustrating a layered structure of the reversing device of FIG. 7 before a horizontal arraying pallet is coupled to the reversing device.
Figure 9:
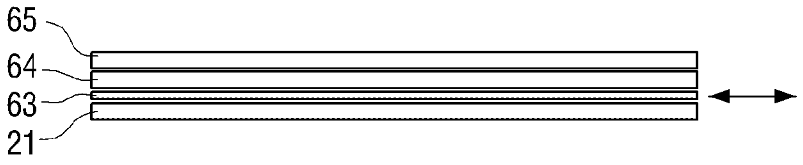
FIG. 9 is a sectional view conceptually illustrating a layered structure of the reversing device of FIG. 8 to which a horizontal arraying pallet is coupled.

The posture changing pallet 64 and the open-close shutter 65 are layered as illustrated in FIGS. 8 and 9. FIG. 8 illustrates a state before the horizontal arraying pallet 21 is coupled to the posture changing pallet 64 of the reversing device 60, and FIG. 9 illustrates a state in that the horizontal arraying pallet 21 is coupled to the posture changing pallet 64. The posture changing pallet 64 is fixed to the reversing frame 61, and the open-close shutter 65 is disposed in the reversing frame 61 to face one surface of the posture changing pallet 64 and to be positioned in at least five points with respect to the posture changing pallet 64. Therefore, on the opposite sides of the reversing frame 61 is disposed shutter driving portions 66 that move the open-close shutter 65 and determine a position of the open-close shutter 65. The shutter driving portions 66 may use a servo motor for accurate positioning. A moving distance of the open-close shutter 65 is determined to selectively open or close the posture changing holes 64-1 of the posture changing pallet 64. The posture changing shutter 63 may be coupled to a surface opposite to the surface of the posture changing pallet 64 on which the open-close shutter 65 is disposed.

Figure 12A:
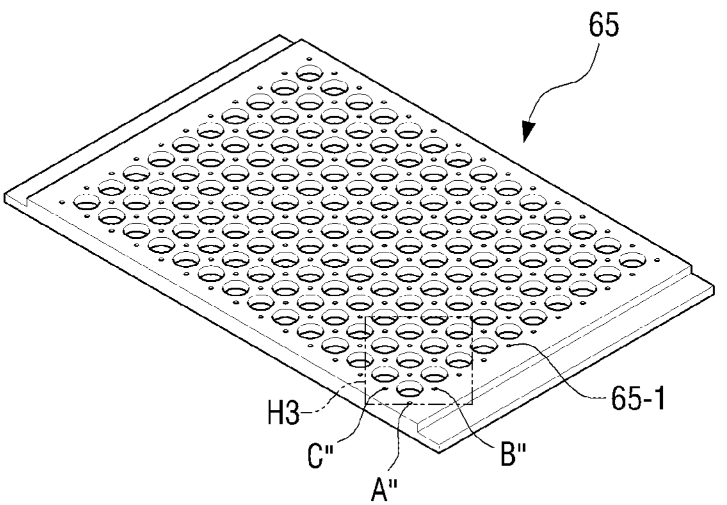
FIG. 12A is a perspective view illustrating a open-close shutter of FIG. 9.
Figure 12B:
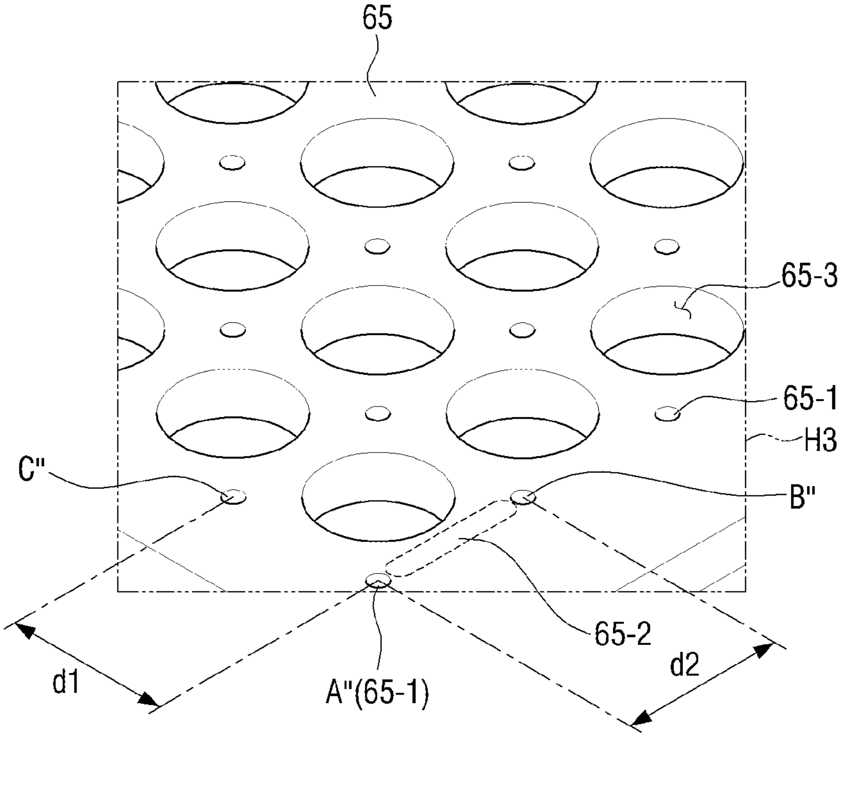
FIG. 12B is an enlarged perspective view illustrating a portion H3 of FIG. 12A.

The open-close shutter 65, as illustrated in FIGS. 12A and 12B, includes a plurality of through holes 65-1. Each of the through holes 65-1 is formed at a position corresponding to the outlet portion 64-lb of one among four posture changing holes A1', A2', A3' and A4', forming each of a plurality of posture changing hole groups A' and B' of the posture changing pallet 64. Therefore, the interval between two nearby through holes A" and B" in FIG. 12B corresponds to the interval between outlet portions 64-1b of two posture changing holes 64-1 corresponding to each other between nearby posture changing hole groups A' and B' of the posture changing pallet 64. For example, the interval d2 between two nearby through holes A" and B" of the open-close shutter 65 of FIG. 12B is the same as the interval d2 between two posture changing holes 64-1 in the same order among two nearby posture changing hole groups A' and B' of FIG. 11B. A blocking portion 65-2 to block the outlet portion 64-1b of the posture changing holes 64-1 is provided between two nearby through holes A" and B" among the plurality of through holes 65-1. Therefore, when the through holes 65-1 of the open-close shutter 65 are aligned with the outlet portion 64-1b of the posture changing pallet 64, the spacer S passes through the open-close shutter 65, and when the blocking portion 65-2 places in front of the outlet portion 64-1b, the spacer S cannot pass the open-close shutter 65. Also, as illustrated in FIG. 12B, a plurality of openings 65-3 may be formed between a plurality of blocking portions 65-2 in a direction perpendicular to the moving direction of the open-close shutter 65. The plurality of openings 65-3 allows the leaked spacers S to be discharged so as to prevent the leaked spacers S from being put between the open-close shutter 65 and the posture changing pallet 64 and can reduce weight of the open-close shutter 65.

Figure 15:
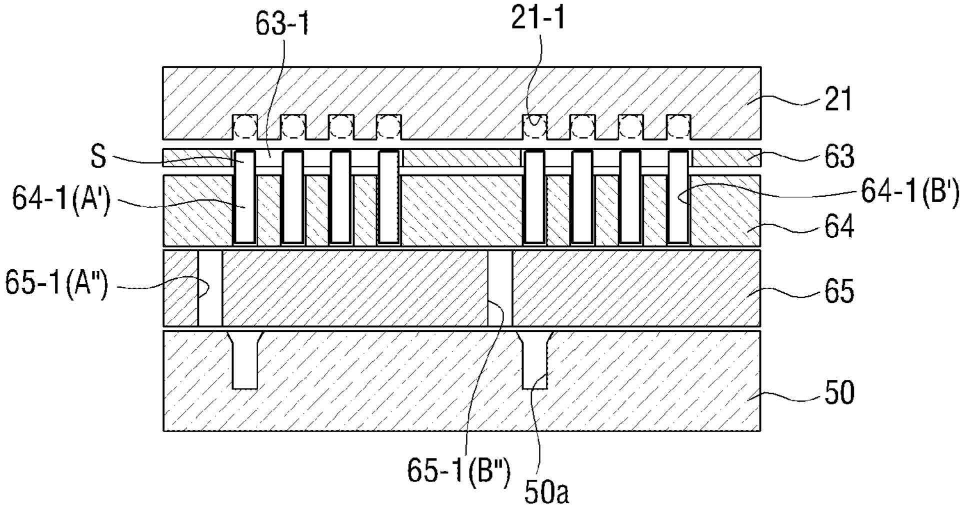
FIGS. 15 and 16 are a partially sectional view for explaining operation of the open-close shutter of FIG. 12*a;*
Figure 16:
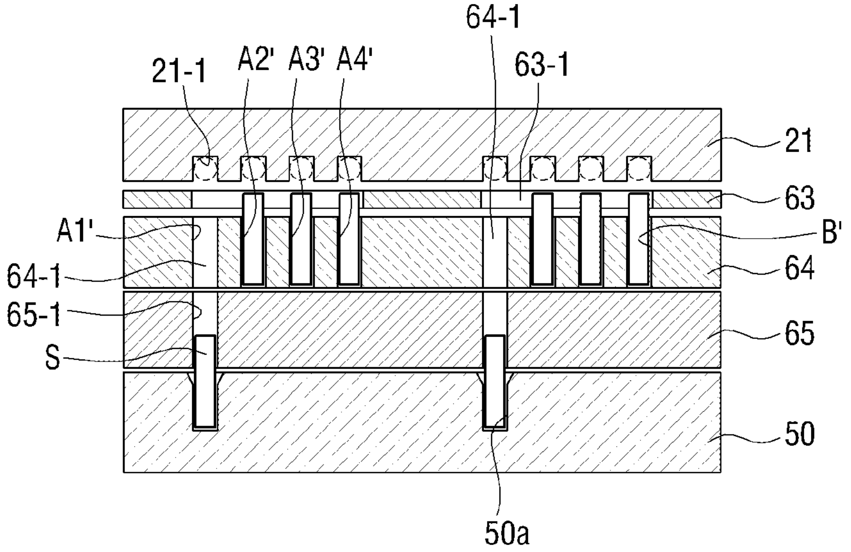

The open-close shutter 65 always blocks all the outlet portions 64-1b of the four posture changing holes 64-1 of the posture changing hole group of the posture changing pallet 64 before receiving a open signal from the controller 10. In other words, the open-close shutter 65, as illustrated in FIG. 15, is located at a first position (original position) at which the blocking portion 65-2 places below the posture changing hole group A' and B' of the posture changing pallet 64. When receiving a first open signal in this state, the open-close shutter 65, as illustrated in FIG. 16, moves to a second position at which the through hole 65-1 places below the first posture changing hole A1' of the posture changing hole group A'. Then, the spacer S that stands vertically at the outlet portion 64-1b of the first posture changing hole A1' falls in a vertical state. At this time, the other three posture changing holes A2', A3' and A4' are blocked by the blocking portion 65-2 so that the spacers S do not fall down. When the open-close shutter 65 receives a second open signal, the open-close shutter 65 moves to a third position at which the through hole 65-1 is placed below a second posture changing hole A2'. Then the spacer S in the second posture changing hole A2' falls and the other two posture changing holes A3' and A4' are blocked by the blocking portion 65-2 so that the spacers S do not fall down. Also, when the open-close shutter 65 receives third and fourth open signals, the open-close shutter 65 moves to fourth and fifth positions at which the through holes 65-1 place below the third posture changing hole A3' and the fourth posture changing hole A4' so that the spacer S falls down. After the open-close shutter 65 moves to the fifth position, the open-close shutter 65 again returns to the first position of the original position.

Figure 13A:
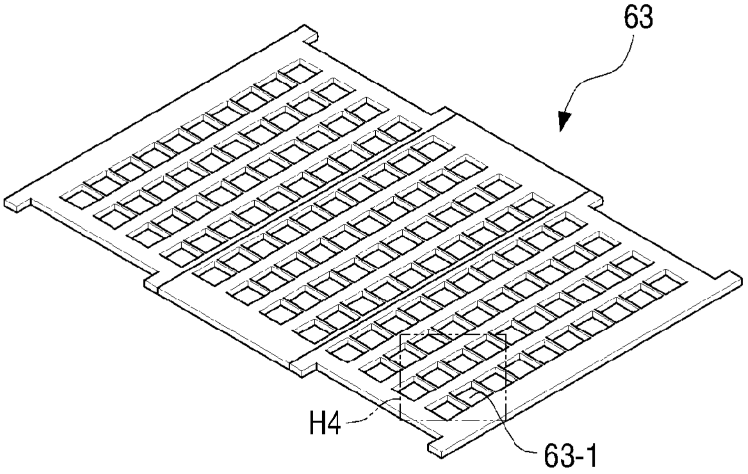
FIG. 13A is a perspective view illustrating a posture changing shutter of FIG. 9.
Figure 13B:
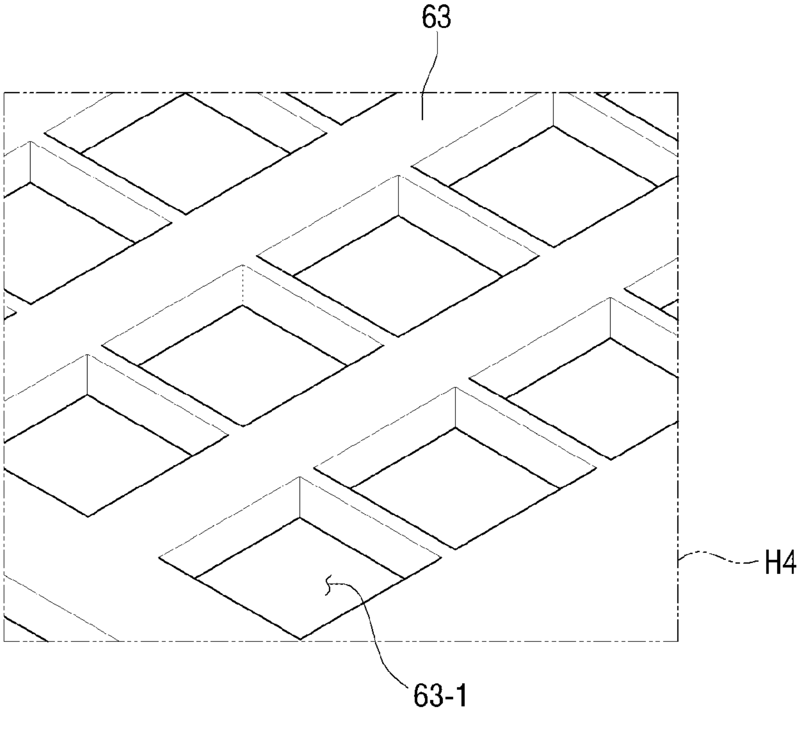
FIG. 13B is an enlarged perspective view illustrating a portion H4 of FIG. 13A.

The posture changing shutter 63 is movably disposed on the surface of the posture changing pallet 64 on which the horizontal arraying pallet 21 will be coupled, namely, the surface on which the open-close shutter 65 is not disposed. The posture changing shutter 63 is to assist the reversing device 60 to rotate to change postures of the spacers S from the horizontal state to the vertical state. One example of the posture changing shutter 63 is illustrated in FIGS. 13A and 13B. The posture changing shutter 63 may be formed in a thin and smooth material so that the posture changing shutter 63 can smoothly move between the posture changing pallet 64 and the horizontal arraying pallet 21. The posture changing shutter 63 has a plurality of push holes 63-1 that are pushed at a time the plurality of spacers S in the posture changing pallet 64 are placed in the vertical state. The push hole 63-1 is formed to have a size that does not prevent four spacers S from falling from the elongate groove group of the horizontal arraying pallet 21 and simultaneously pushes the four spacers S. The posture changing shutter 63 may move in a direction substantially perpendicular to the direction in which the open-close shutter 65 moves with respect to the posture changing pallet 64. The posture changing shutter 63 can reciprocate between two positions, that is, an original position in which the posture changing shutter 63 opens between the elongate groove groups A, B and C of the horizontal arraying pallet 21 and the posture changing hole groups A', B' and C' of the posture changing pallet 64 so that the spacers S are not prevented from falling and an array position in which the posture changing shutter 63 pushes the spacers S to be arrayed in the vertical state. An air cylinder, etc. may be used as a driving source 68 for the posture changing shutter 63. Also, if the posture changing holes 64-1 of the posture changing pallet 64 is properly designed, the posture changing shutter 63 may be omitted.

The rotating unit 62 is formed to rotate the reversing frame 61 by 180 degrees. Referring to FIG. 7, the rotating unit 62 is formed substantially in a '⊏' shape and includes a supporting frame 62-1 supporting rotation of the reversing frame 61 and a rotating portion 62-2 that is disposed at a side of the supporting frame 62-1 and allows the reversing frame 61 to rotate. Various driving members can be used as the rotating portion 62-2 as long as they can rotate the reversing frame 61 by 180 degrees. Therefore, detail explanations thereof will be omitted.

Pallet fixing portions 67 that fix the horizontal arraying pallet 21 with respect to the posture changing pallet 64, are disposed at opposite sides of the reversing frame 61. In the exemplary embodiment illustrated in FIG. 7, four pallet fixing portions 67 are disposed at the reversing frame 61. Therefore, even when the reversing frame 61 rotates and moves, the horizontal arraying pallet 21 is not separated from the posture changing pallet 64.

Figure 14A:
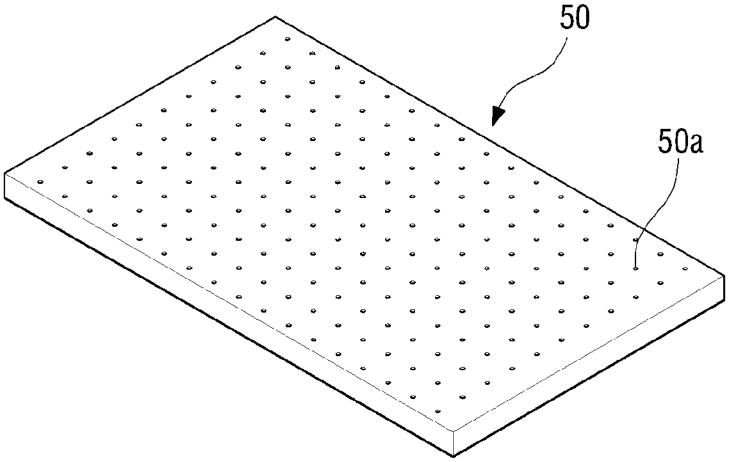
FIG. 14A is a perspective view schematically illustrating a vertical arraying pallet of FIG. 5.
Figure 14B:
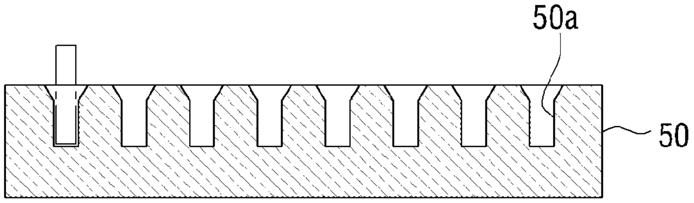
FIG. 14B is a partially sectional view illustrating a vertical groove of FIG. 14A.

The vertical arraying pallet 50 receives the plurality of spacers S changed from the horizontal state to the vertical state by the reversing device 60 and maintains the spacers in the vertical state. One example of the vertical arraying pallet 50 is illustrated in FIG. 14A. The vertical arraying pallet 50 is formed in a plane plate. The plurality of vertical grooves 50*a* which allow the plurality of spacers S to maintain the vertical state, are formed on the top surface of the vertical arraying pallet 50. The bottoms of the vertical grooves 50*a* are blocked as illustrated in FIG. 14B. The area of the vertical arraying pallet 50 is the same size as that of the panel 9. The plurality of vertical grooves 50*a* are formed at the same pitches D1 and D2 as those of the plurality of spacers that will be mounted on the panel 9. In other words, the plurality of vertical grooves 50*a* of the vertical arraying pallet 50 and spacer mounting positions of the panel 9 correspond one to one.

The horizontal arraying pallet 21 and the posture changing pallet 64 are formed to have approximately the same size and the same number of elongate grooves 21-1 and posture changing holes 64-1 as that of all pieces of the spacers S required on the panel 9. If the vertical arraying pallet 50 is divided into four equal parts 50-1, 50-2, 50-3 and 50-4 (see FIG. 14A), the horizontal arraying pallet 21 and the posture changing pallet 64 are formed to have a size corresponding to one part of the four equal parts 50-1, 50-2, 50-3 and 50-4 of the vertical arraying pallet 50, namely, ¼ of the area of the vertical arraying pallet 50. The open-close shutter 65 has the approximate same size as that of the posture changing pallet 64 and has the same number of the through holes 65-1 as that of the spacers S that will be inserted in one part of the four equal parts 50-1, 50-2, 50-3 and 50-4 of the vertical arraying pallet 50. Therefore, all pieces of spacers S of the panel 9 received in the horizontal arraying pallet 21 can be inserted in order in the four equal parts 50-1, 50-2, 50-3 and 50-4 of the vertical arraying pallet 50 by using the open-close shutter 65.

The size of each of the horizontal arraying pallet 21, posture changing pallet 64, posture changing shutter 63 and open-close shutter 65 may be properly determined to consider the size of the panel 9 and the automatic spacers mounting system 1. In the exemplary embodiments, the horizontal arraying pallet 21 having a size of approximately ¼ of the panel 9 is used for purposes of the description of an exemplary embodiment. However, this is only one example and does not limit the size of the horizontal arraying pallet 21.

Referring to FIGS. 1 and 2, the pallet carrying apparatus 6 may be disposed between the vertical arraying device 5 and the spacers mounting apparatus 7. The pallet carrying apparatus 6 is formed to supply and receive the vertical arraying pallet 50 to and from the vertical arraying device 5 and the spacers mounting apparatus 7. In detail, the pallet carrying apparatus 6 supplies an empty vertical arraying pallet 50 in which the spacers are not inserted to the vertical arraying device 5. After that, the pallet carrying apparatus 6 receives the vertical arraying pallet 50 in which the spacers S are inserted from the vertical arraying device 5 and carries the vertical arraying pallet 50 to the spacers mounting apparatus 7. Then, the pallet carrying apparatus 6 supplies a new empty vertical arraying pallet 50 to the vertical arraying device 5, and receives and stores the vertical arraying pallet 50 the spacers S of which are all used in the spacers mounting apparatus 7 and that becomes empty. The pallet carrying apparatus 6 can use various structures, such as a conveyor, as long as they can carry the vertical arraying pallet 50. Therefore, a detailed explanation thereof will be omitted.

Figure 21:
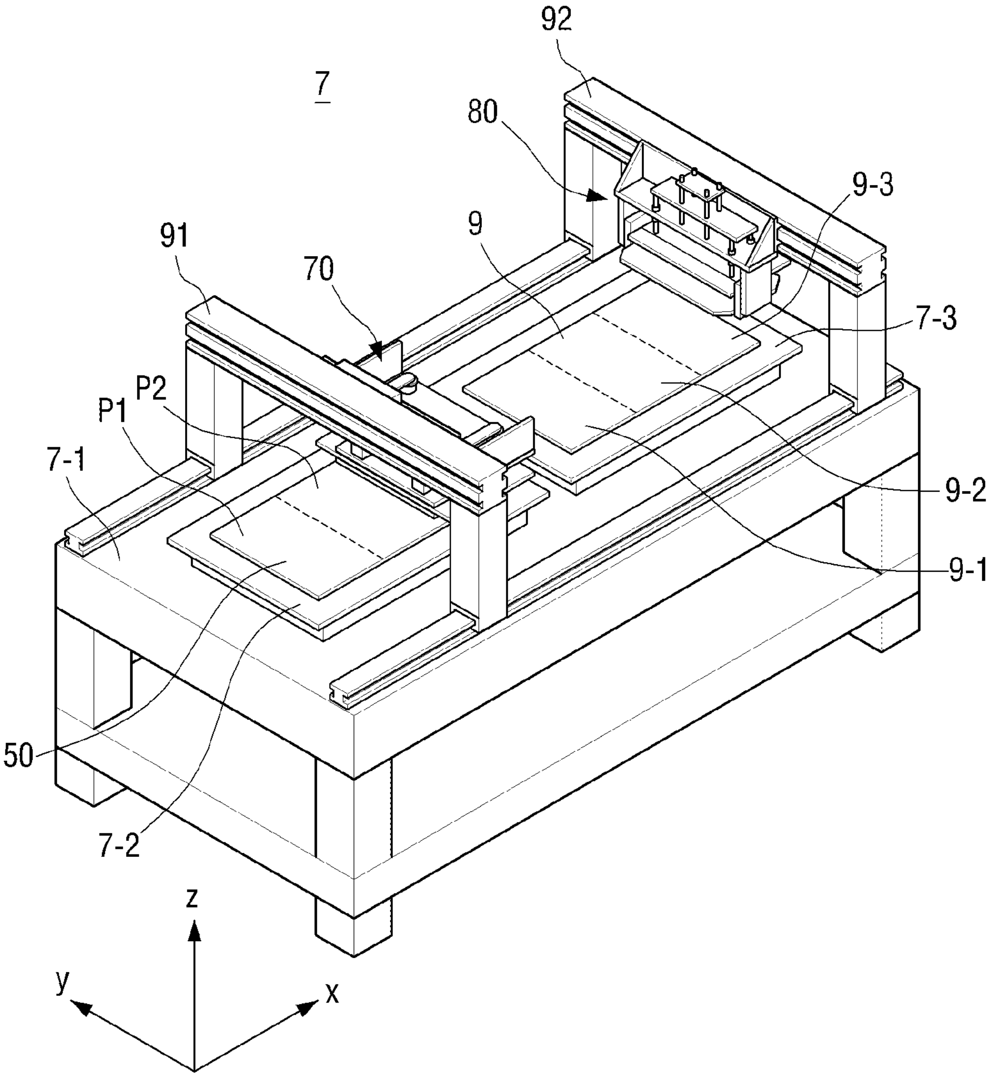
FIG. 21 is a perspective view schematically illustrating a spacers mounting apparatus of the automatic spacers mounting system of FIG. 2.
Figure 22:
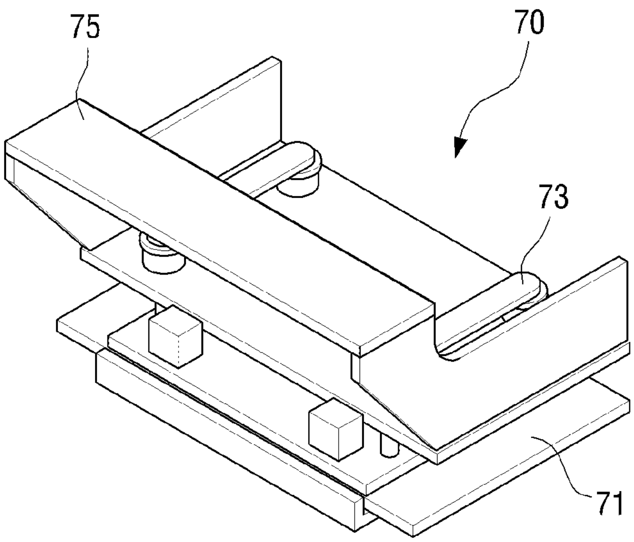
FIG. 22 is a perspective view illustrating a vacuum absorbing device of the spacer mounting apparatus of FIG. 21.
Figure 23:
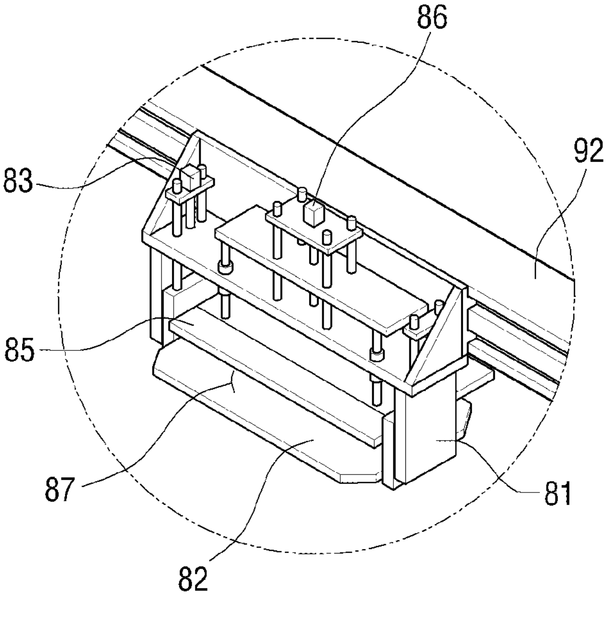
FIG. 23 is a perspective view schematically illustrating a guiding and pressing device of the spacer mounting apparatus of FIG. 21.

FIG. 21 is a perspective view schematically illustrating a spacer mounting apparatus of the automatic spacers mounting system of FIG. 2. FIG. 22 is a perspective view illustrating a vacuum absorbing device of the spacer mounting apparatus of FIG. 21. FIG. 23 is a perspective view schematically illustrating a guiding and pressing device of the spacer mounting apparatus.

Referring to FIG. 21, the spacers mounting apparatus 7 may include a mounting base 7-1, a vacuum absorbing device 70, a guiding and pressing device 80, a first loader 91, and a second loader 92.

The mounting base 7-1 simultaneously supports the vertical arraying pallet 50 and the panel 9. The mounting base 7-1, the first loader 91, and second loader 92 move above the vertical arraying pallet 50 and the panel 9. A pallet centering unit 7-2 that positions and fixes the vertical arraying pallet 50 and a panel centering unit 7-3 that positions and fixes the panel 9 are disposed in a top surface of the mounting base 7-1. The pallet centering unit 7-2 and panel centering unit 7-3 can use various structures as long as they can position and fix the pallet 50 and panel 9 in a rectangular shape; therefore, detailed explanations thereof will be omitted. Further, pallet carrying unit (not illustrated) that supplies and receives the vertical arraying pallet 50 to and from the pallet carrying apparatus 6 and panel carrying unit (not illustrated) that supplies and receives the panel 9 to and from the glue dispensing apparatus 2 are provided on the mounting base 7-1.

Referring to FIG. 22, the vacuum absorbing device 70 picks up the plurality of spacers S vertically inserted in the vertical arraying pallet 50 and carries the spacers S to the panel 9. The vacuum absorbing device 70 may include an absorbing plate 71, an absorbing plate lifting portion 73 and an absorbing frame 75.

Figure 24:
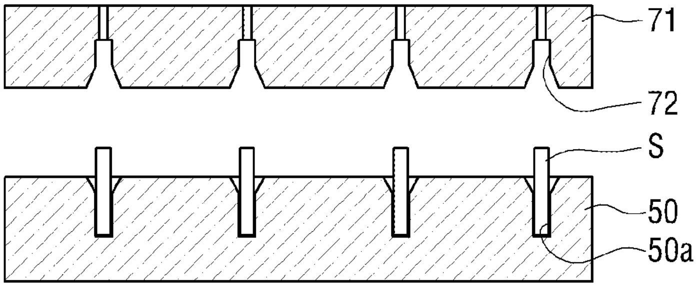
FIG. 24 is a partially sectional view conceptually illustrating a state in which a vacuum absorbing device is placed above a vertical arraying pallet.

The absorbing plate 71 is a vacuum chuck that can absorb the plurality of spacers S by vacuum suction force, and has a plurality of absorbing holes 72 formed on a bottom surface of the absorbing plate 71. The plurality of absorbing holes 72 are connected with a vacuum generator (not illustrated). Therefore, when turning on the vacuum generator, the vacuum is generated so that suction force is generated in the plurality of absorbing holes 72. After the vacuum generator is turned off, the vacuum is broken so that the suction force is not generated in the absorbing holes 72. One example of the absorbing holes 72 is illustrated in FIG. 24. In FIG. 24 vacuum pipe lines connecting the plurality of absorbing holes 72 with the vacuum generator (not illustrated) are not illustrated. The absorbing plate 71 has a number of absorbing holes 72 that can absorb, at the same time, ⅓ of all pieces of spacers S received in the vertical arraying pallet 50. For example, when the vertical arraying pallet 50 receives Q pieces of spacers S, the absorbing plate 71 has the number of absorbing holes 72 that can absorb. at the same time, Q/3 pieces of spacers S. In other words, as illustrated in FIG. 21, if the vertical arraying pallet 50 is divided into three equal parts, namely three pallet regions P-1, P-2 and P-3, the absorbing plate 71 is formed to absorb, at the same time, all the spacers S in one of the three equal parts.

The absorbing plate lifting portion 73 moves the absorbing plate 71 in a vertical direction (Z direction) with respect to the mounting base 7-1, and an air cylinder may be used as the absorbing plate lifting portion 73.

The absorbing frame 75 supports the absorbing plate 71 which is lifted and lowered by the absorbing plate lifting portion 73, and fixes the vacuum absorbing device 70 with respect to the first loader 91.

The first loader 91 allows the vacuum absorbing device 70 to move above the vertical arraying pallet 50 and the panel 9 and is formed to move in the X direction with respect to the mounting base 7-1. Referring to FIG. 21, the first loader 91 is formed substantially in a bridge shape and moves in a straight line in the X direction by a linear movement guide member 92-1 disposed on the mounting base 7-1. The vacuum absorbing device 70 is fixed to an upper portion of the first loader 91.

Referring to FIG. 23, the guiding and pressing device 80 guides the spacer S falling from the vacuum absorbing device 70 to the panel 9, and presses the spacer S against the panel 9. The guiding and pressing device 80 may include a guiding frame 81, a guiding plate 82, a guiding plate driving unit 83, a pressing plate 85, and a pressing plate driving unit 86.

The guiding frame 81 allows the guiding and pressing device 80 to be fixed to the second loader 92, and is formed to support up and down movement of the guiding plate 82 and the pressing plate 85.

Figure 27:
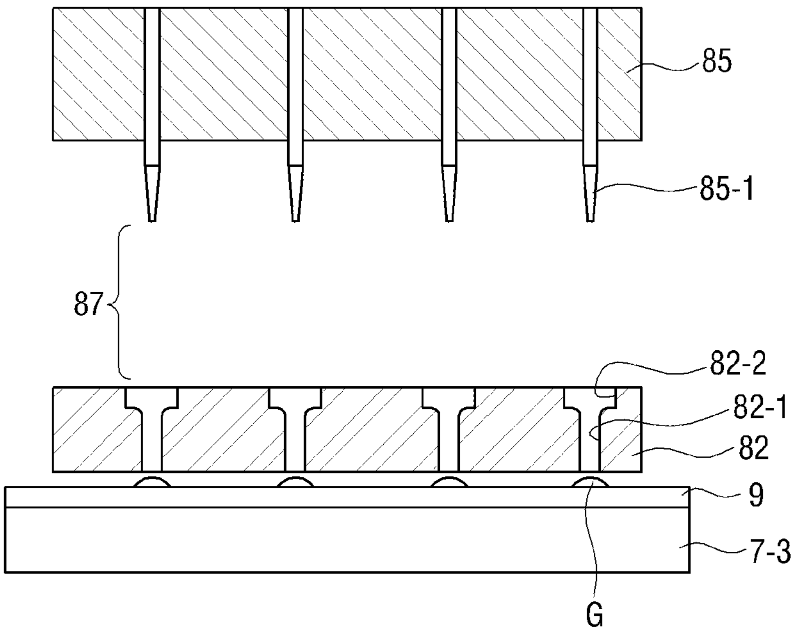
FIG. 27 is a partially sectional view conceptually illustrating a state in which a guiding and pressing device is placed above a panel.

The guiding plate 82 is located above the panel 9 and is formed to guide the spacers S falling from the vacuum absorbing device 70 to the glue dots G of the panel 9. The guiding plate 82 is formed to have a size corresponding to the absorbing plate 71 of the vacuum absorbing device 70. Therefore, the guiding plate 82 has the same number of guiding holes 82-1 as the number of absorbing holes 72 of the absorbing plate 71. In other words, the plurality of guiding holes 82-1 is formed at the same pitches as the spacer pitches D1 and D2. Therefore, when the guiding plate 82 is placed above the panel 9, as illustrated in FIG. 27, the glue dots G sprayed on the panel 9 are located directly below the guiding holes 82-1. The guiding hole 82-1 is formed to have a diameter to guide the spacer S and has proper tolerance so that the spacer S is placed on the panel 9 with accuracy of squareness and position required by the panel 9. One example of the guiding holes 82-1 is illustrated in FIG. 27. The guiding hole 82-1 is formed to pass through the guiding plate 82 and has a recess portion 82-2 that is formed at a top end of the guiding hole 82-1 and has a diameter larger than that of the guiding hole 82-1. A corner of the guiding hole 82-1 reaching the recess portion 82-2 may be formed in a round shape for the spacer S to be easily inserted in the guiding hole 82-1.

The guiding plate driving unit 83 is formed to allow the guiding plate 82 to move up and down in the vertical direction (Z direction) with respect to the mounting base 7-1. The guiding plate driving unit 83 may be configured to have air cylinders and linear movement guide members.

The pressing plate 85 is disposed above the guiding plate 82 and is formed to move up and down with respect to the guiding plate 82. A plurality of pressing pins 85-1 that can be inserted into the guiding holes 82-1 formed on the guiding plate 82 are disposed on a bottom surface of the pressing plate 85. One example of the pressing plate 85 is illustrated in FIG. 27. The plurality of pressing pins 85-1 are formed to have the same number as the number of the guiding holes 82-1 of the guiding plate 82.

The pressing plate driving unit 86 is formed to allow the pressing plate 85 to move up and down with respect to the guiding plate 82. Accordingly, the pressing plate 85 is moved up and down in the vertical direction (Z direction) with respect to the mounting base 7-1 by the pressing plate driving unit 86. The pressing plate driving unit 86 may be configured to have an air cylinder and linear movement guide members.

Figure 28:
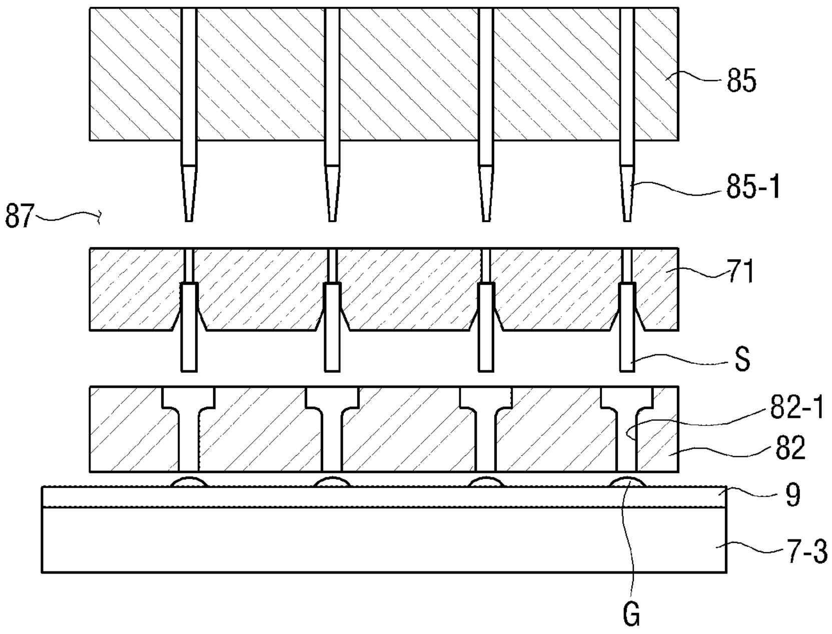
FIG. 28 is a partially sectional view conceptually illustrating a state in which the vacuum absorbing device of FIG. 22 is placed in a vacuum absorbing device receiving space of the guiding and pressing device of FIG. 27.

A vacuum absorbing device receiving space 87, in which the vacuum absorbing device 70 is received, is formed between the pressing plate 85 and the guiding plate 82. In other words, when the pressing plate 85 is moved up and the pressing plate 85 is moved down, the vacuum absorbing device 70 with the absorbed spacers S can be received in the space 87 between the pressing plate 85 and the guiding plate 82. At this time, the vacuum absorbing device 70 is positioned so that the absorbing holes 72 are aligned with the guiding holes 82-1 of the pressing plate 85 of the guiding and pressing device 80. FIG. 28 illustrates a state in that the vacuum absorbing device 70 is located between the pressing plate 85 and the guiding plate 82. Accordingly, after the vacuum absorbing device 70 releases the absorbed spacers S, the spacers S are attached to the glue dots G of the panel 9 through the guiding holes 82-1 of the guiding plate 82 of the guiding and pressing device 80.

The controller 10 is configured to control the horizontal arraying device 3, the pallet loader 4, the vertical arraying device 5, and the vacuum absorbing device 70, the guiding and pressing device 80, the first loader 91 and second loader 92 of the spacers mounting apparatus 7. The controller 10 may also be formed to control the pallet carrying apparatus 6, the glue dispensing apparatus 2, etc. Therefore, when the horizontal arraying pallet 21 is located at the pallet loading portion 54, the controller 10 controls the arraying loader 52 to allow the reversing device 60 to be moved above the pallet loading portion 54 and to be coupled with the horizontal arraying pallet 21. Then, the controller 10 controls the reversing device 30 to rotate by 180 degrees and the reversing device 30 to be placed above the vertical arraying pallet 50. After that, the controller 10 operates the open-close shutter 65 so that the plurality of spacers S fall into the plurality of vertical grooves 50*a* of the vertical arraying pallet 50. After inserting of the spacers S is completed, the controller 10 controls the pallet carrying apparatus 6 to load the vertical arraying pallet 50 with the inserted spacers S to the spacers mounting apparatus 7. Then, the controller 10 loads the panel 9 on which glue G is sprayed by the glue dispensing apparatus 2 to the spacers mounting apparatus 7. After that, the controller 10 controls the vacuum absorbing device 70, the pressing plate driving unit 86, the first loader 91 and the second loader 92 so that the plurality of spacers S inserted in the vertical arraying pallet 50 are adhered to the glue G sprayed on the panel 9.

Hereinafter, operation of the automatic spacers mounting system 1 according to an exemplary embodiment will be explained in detail with reference to accompanying figures. In the description below, it is noted that although the controller 10 is not specifically described, control of all elements of the system is performed by the controller 10.

First, glue G is sprayed on the panel 9 by using the glue dispensing apparatus 2 (S11). In other words, the panel 9 is loaded on the base 11 of the glue dispensing apparatus 2 illustrated in FIG. 2. At this time, the panel 9 is positioned and fixed by the panel centering unit 12. After that, when operating the glue dispensing apparatus 2, the adhesive head 15 with the plurality of glue guns 13 is moved in the X direction by the gun moving unit 17 to spray in a dot the glue G on the panel 9 at intervals D1 and D2 at which the spacers S will be mounted, thereby forming the plurality of glue dots G. After the spraying of the glue G is completed as illustrated in FIG. 4, the panel 9 is loaded from the base 11 of the glue dispensing apparatus 2 to the mounting base 7-1 of the spacers mounting apparatus 7 (S12). At this time, if the panel carrying unit (not illustrated) is disposed, the panel 9 may be automatically carried from the base 11 of the glue dispensing apparatus 2 to the spacers mounting apparatus 7. The panel 9 carried to the spacers mounting apparatus 7 is positioned and fixed by the panel centering unit 7-3 disposed in the mounting base 7-1.

While the glue dispensing apparatus 2 is spraying glue G on the panel 9, as illustrated in FIG. 6, the plurality of spacers S are horizontally arrayed in the horizontal arraying pallet 21 (S21). Since the horizontal arraying of the spacer S is performed in a different process by using a different apparatus from the glue dispensing apparatus 2 that is used in a process of spraying glue G, the horizontal arraying of the spacers S can be performed while spraying the glue G on the panel 9. The horizontal arraying of the spacers S is performed by using the horizontal arraying device 3. In other words, the horizontal arraying pallet 21 is mounted on the top surface of the seesaw table 23 of the horizontal arraying device 3. After that, while supplying a plurality of spacers S to the horizontal arraying pallet 21, the horizontal arraying pallet 21 is allowed to perform a seesaw motion as illustrated in FIG. 6, and at the same time, vibration of a predetermined frequency is applied to the horizontal arraying pallet 21. Then, the spacers S are inserted into the plurality of elongate grooves 21-1 formed on the horizontal arraying pallet 21 to be arrayed in a horizontal state. In this exemplary embodiment, the horizontal arraying pallet 21 has a number of elongate grooves 21-1 corresponding to the number of all spacers S used in one panel 9 so as to array, at the same time all, spacers S that will be used in the one panel 9. Also, the horizontal arraying pallet 21 is formed to have a size corresponding to ¼ of the panel 9. However, the horizontal arraying pallet 21 which has a size of ¼ of the panel 9 is only one example. The horizontal arraying pallet 21 may be formed to have the same size as that of the panel 9 or a size corresponding to ½ of the panel 9.

The horizontal arraying pallet 21 receiving the horizontally arrayed spacers S is carried to the pallet loading portion 54 in the arraying base 51 of the vertical arraying device 5 by the pallet loader 4. After the pallet loader 4 is located above the horizontal arraying device 3, the gripper 30 moves down and grips the horizontal arraying pallet 21 by using the gripping portions 31. Then, after the gripper moves up, the pallet loader 4 carries the gripper 30 to the pallet loading portion 54. Thereafter, the gripper 30 moves down to put the horizontal arraying pallet 21 in the pallet loading portion 54.

Figure 17:
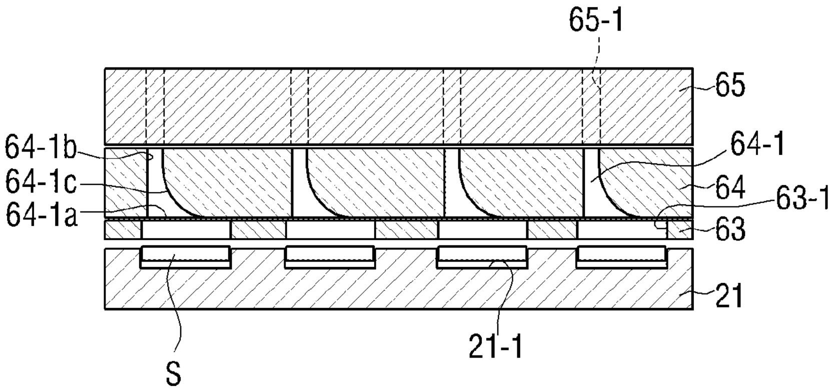
FIG. 17 is a partially sectional view conceptually illustrating a relationship of a horizontal arraying pallet, a posture changing shutter, a posture changing pallet, and a open-close shutter when the horizontal arraying pallet is coupled to a reversing device.
Figure 19:
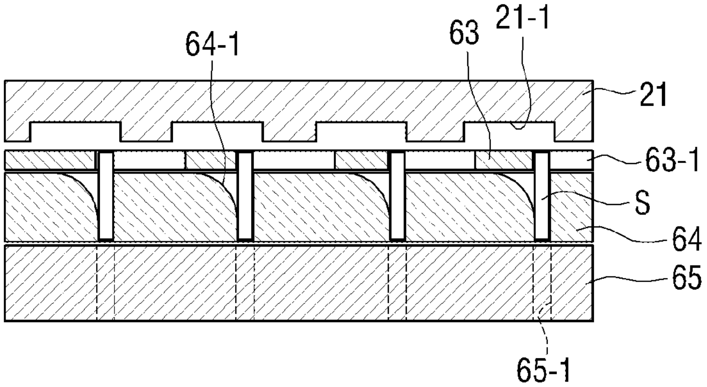
FIG. 19 is a partially sectional view conceptually illustrating a state in which the posture changing shutter operates in FIG. 18.

After the horizontal arraying pallet 21 is placed at the pallet loading portion 54, the controller 10 controls the arraying loader 52 and the reversing device 60 so that the reversing device 60 is coupled to the horizontal arraying pallet 21 and the horizontal arraying pallet 21 is rotated by 180 degrees, thereby arraying vertically the spacers S (S23). In other words, the arraying loader 52 uses the X-axis portion 52-3 and Y-axis portion 52-2 to allow the reversing device 60 to be located above the pallet loading portion 54. After that, using the Z-axis portion 52-1, the reversing device 60 is lowered so that the posture changing shutter 63 of the reversing device 60 contacts the horizontal arraying pallet 21. Then, the pallet fixing portions 67 operate to allow the horizontal arraying pallet 21 to be fixed to the posture changing pallet 64. FIG. 9 conceptually illustrates a state in that the horizontal arraying pallet 21 is coupled to the posture changing pallet 64 of the reversing device 60. When the horizontal arraying pallet 21 is coupled with the posture changing pallet 64, the elongate grooves 21-1 of the horizontal arraying pallet 21 are aligned with the inlet portions 64-1 a of the posture changing holes 64-1 of the posture changing pallet 64, the blocking portion 65-2 of the open-close shutter 65 blocks the outlet portions 64-1*b* of the posture changing holes 64-1, and the push hole 63-1 of the posture changing shutter 63 is located below the elongate grooves 21-1 and does not block the elongate grooves 21-1 of the horizontal arraying pallet 21. FIG. 17 conceptually illustrates the relationship among the elongate grooves 21-1, push hole 63-1, posture changing holes 64-1 and through holes 65-1 of each of the horizontal arraying pallet 21, posture changing shutter 63, posture changing pallet 64 and open-close shutter 65. Then, the arraying loader 52 lifts the reversing device 60 and rotates the reversing frame 61 by 180 degrees. After the reversing frame 61 is rotated by 180 degrees, as illustrated in FIG. 18, the open-close shutter 65 faces downward. Then, the posture changing shutter driving portion 68 is operated so that the posture changing shutter 63 is moved by a predetermined distance. As a result, the spacer S received in the elongate groove 21-1 of the horizontal arraying pallet 21 passes through the inlet portion 64-1*a* and curve portion 64-1*c* of the posture changing hole 64-1 of the posture changing pallet 64 and places in a vertical state at the outlet portion 64-1*b* of the posture changing hole 64-1 blocked by the blocking portion 65-2 of the open-close shutter 65. At this time, the top end of the spacer, as illustrated in FIG. 19, is located in the push hole 63-1 of the posture changing shutter 63 so as to maintain the vertical state.

Figure 20:
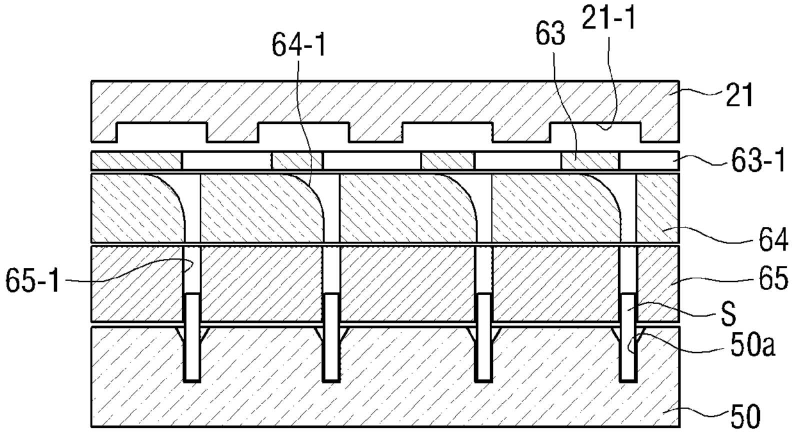
FIG. 20 is a partially sectional view conceptually illustrating a state in which the open-close shutter operates in FIG. 19.

After that, the controller 10 controls the arraying loader 52 so that the reversing device 60 is located above the vertical arraying pallet 50 and then the plurality of spacers S of the horizontal arraying pallet 21 is inserted into the vertical arraying pallet 50 (S25). At this time, since the horizontal arraying pallet 21 receives all spacers S that will be used in one panel 9 in an area corresponding to ¼ of the panel 9, the arraying loader 52 allows the reversing device 60 to be located above a region (a first part) 50-1 corresponding to one of the four equal parts 50-1, 50-2, 50-3 and 50-4 of the vertical arraying pallet 50 corresponding to the size of the panel 9. After that, when moving down the Z-axis portion 52-1 of the arraying loader 52, the reversing device 60 is lowered so that the open-close shutter 65 is placed nearly above the first part of the vertical arraying pallet 50. At this time, as illustrated in FIG. 15, the outlet portion 64-1*b* of the posture changing hole 64-1 of the posture changing pallet 64 is aligned with the vertical grooves 50*a* of the vertical arraying pallet 50 in a straight line. Then, the controller 10 operates the open-close shutter 65 so that the through hole 65-1 of the open-close shutter 65 is placed below the outlet portion 64-1*b* of the first posture changing hole A1' of the posture changing hole groups A' (see FIGS. 16 and 20) (S29). As a result, the spacer S in the outlet portion 64-1*b*, by force of gravity, passes the through hole 65-1 of the open-close shutter 65, and, as illustrated in FIGS. 16 and 20, is inserted into the vertical grooves 50*a* of the vertical arraying pallet 50 so as to be vertically arrayed (S31). Here, FIG. 20 is a partial sectional view illustrating FIG. 16 taken along a side direction of FIG. 16. Therefore, in FIG. 20, the open-close shutter 65 moves in a direction perpendicular to the surface of the paper.

After that, the controller 10 moves the arraying loader 52 so that the reversing device 60 is placed above a second part 50-2 of the vertical arraying pallet 50. After that, the open-close shutter 65 is moved so that the through holes 65-1 is placed below the outlet portion 64-1*b* of the second posture changing hole A2' (see FIG. 14). Then, the plurality of spacers S placed in the outlet portion 64-1*b* of each of the plurality of second posture changing holes 64-1 of the posture changing pallet 64 fall down to be inserted into the vertical grooves 50*a* of the vertical arraying pallet 50.

Next, the controller 10 again moves the arraying loader 52 so that the reversing device 60 is moved above a third portion 50-3 of the vertical arraying pallet 50. After that, the open-close shutter 65 is moved so that the through holes 65-1 is placed below the outlet portion 64-1*b* of the third posture changing hole A3'. Then, the plurality of spacers S placed in the outlet portion 64-1*b* of each of the plurality of third posture changing holes A3' of the posture changing pallet 64 fall down to be inserted into the vertical grooves 50*a* of the vertical arraying pallet 50.

Finally, the controller 10 again moves the arraying loader 52 so that the reversing device 60 is moved above a fourth portion 50-4 of the inserting guide 50. After that, the open-close shutter 65 is moved so that the through holes 65-1 is placed below the outlet portion 64-1*b* of the fourth posture changing hole A4'. Then, the plurality of spacers S placed in the outlet portion 64-1*b* of each of the plurality of fourth posture changing holes A4' of the posture changing pallet 64 fall down to be inserted into the vertical grooves 50*a* of the vertical arraying pallet 50.

After inserting the spacers S into the vertical arraying pallet 50 is completed, the controller 10 allows the vertical arraying pallet 50 to be carried to the spacers mounting apparatus 7 through the pallet carrying apparatus 6 (S27). The vertical arraying pallet 50 carried to the spacers mounting apparatus 7 is positioned and fixed by the pallet centering unit 7-2. While the vertical arraying pallet 50 with the inserted spacers S is loaded to the spacers mounting apparatus 7, the pallet carrying apparatus 6 can load an empty vertical arraying pallet 50 to the vertical arraying device 5.

After the panel 9 on which glue is sprayed and the vertical arraying pallet 50 with the inserted spacers S are loaded to the mounting base 7-1, the controller 10 controls the second loader 92 for the guiding and pressing device 80 to be located above the panel 9 (S31). Then the controller 10 controls the first loader 91 so that the vacuum absorbing device 70 absorbs the spacers S in the vertical arraying pallet 50 and is then moved to the guiding and pressing device 80 (S33).

Figure 25:
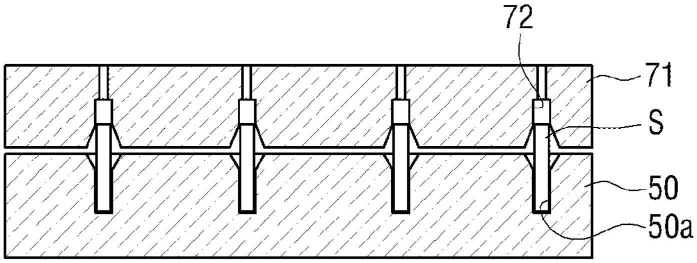
FIG. 25 is a partially sectional view conceptually illustrating a state in which a vacuum absorbing device absorbs spacers from a vertical arraying pallet.
Figure 26:
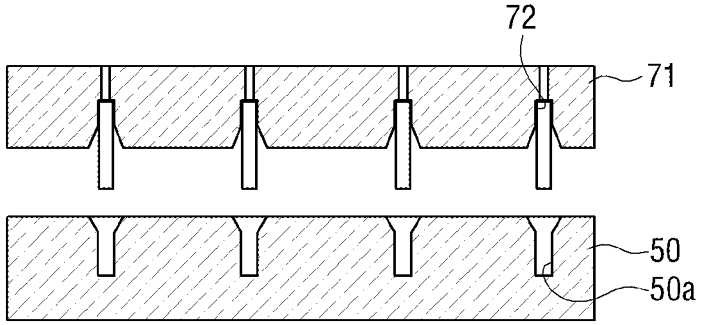
FIG. 26 is a partially sectional view conceptually illustrating a state in which a vacuum absorbing device with absorbed spacers moves up from a vertical arraying pallet.

In detail, after the vertical arraying pallet 50 with the inserted spacers S is loaded to the mounting base 7-1, the controller 10 controls the first loader 91 for the vacuum absorbing device 70 to be located above the vertical arraying pallet 50. At this time, since the absorbing plate 71 of the vacuum absorbing device 70 is formed to have a size corresponding to ⅓ of the size of the vertical arraying pallet 50, the controller 10 controls the first loader 91 so that the vacuum absorbing device 70 is located above a region (a first region) P1 corresponding to one of three equal parts P1, P2 and P3 of the vertical arraying pallet 50. FIG. 24 conceptually illustrates a state in that the absorbing plate 71 places above the vertical arraying pallet 50. After the vacuum absorbing device 70 is located above the first region P1 by the first loader 91, the vacuum absorbing device 70 lowers the absorbing plate 71 so that the absorbing holes 72 of the absorbing plate 71 are placed at top ends of the spacers S as illustrated in FIG. 25. In this state, when vacuum is generated, the spacers S are absorbed into the absorbing holes 72. After that, when the vacuum absorbing device 70 is moved up, as illustrated in FIG. 26, the spacers S are separated from the vertical arraying pallet 50.

While the vacuum absorbing device 70 absorbs the spacers S, the controller 10 controls the second loader 92 for the guiding and pressing device 80 to be located above the panel 9. At this time, since the guiding plate 82 of the guiding and pressing device 80 is also formed to have a size corresponding to ⅓ of the size of the panel 9, the controller 10 controls the second loader 92 so that the guiding and pressing device 80 is located above a region (a first part) 9-1 corresponding to one of three equal parts 9-1, 9-2 and 9-3 of the panel 9. FIG. 27 conceptually illustrates a state in that the guiding and pressing device 80 places above the panel 9. After the guiding and pressing device 80 is located above the first part 9-1 of the panel 9 by the second loader 92, the guiding and pressing device 80 moves the pressing plate 85 down so as to form the vacuum absorbing device receiving space 87 in which the vacuum absorbing device 70 is received between the pressing plate 85 and the guiding plate 82.

Figure 29:
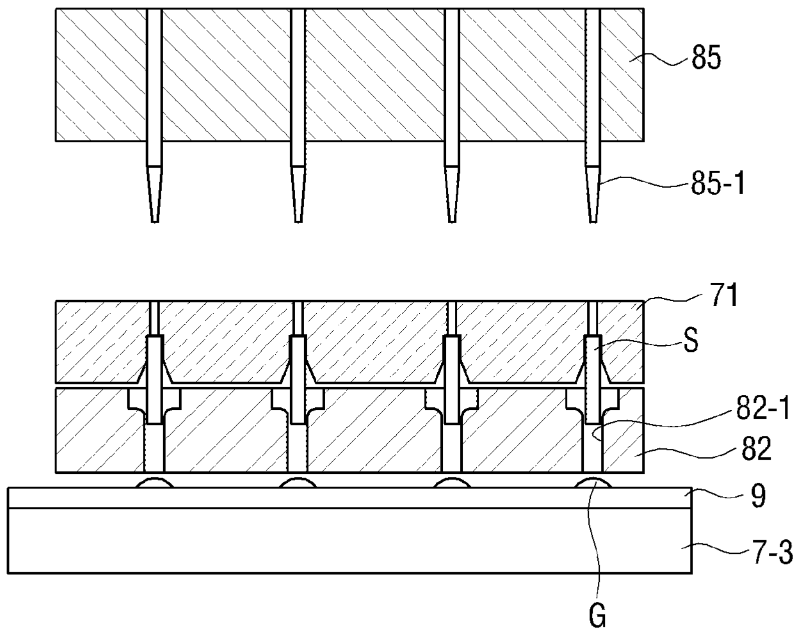
FIG. 29 is a partially sectional view conceptually illustrating a state in which a vacuum absorbing device moves down so that spacers are placed at upper ends of guiding holes of a guiding plate.
Figure 30:
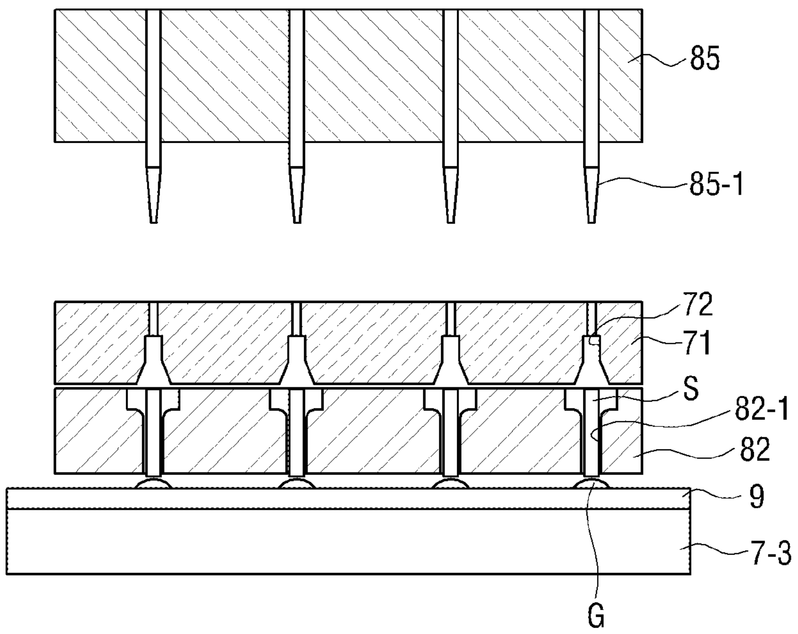
FIG. 30 is a partially sectional view conceptually illustrating a state in which after the vacuum of a vacuum absorbing device is off, spacers are adhered to a panel through guiding holes.
Figure 31:
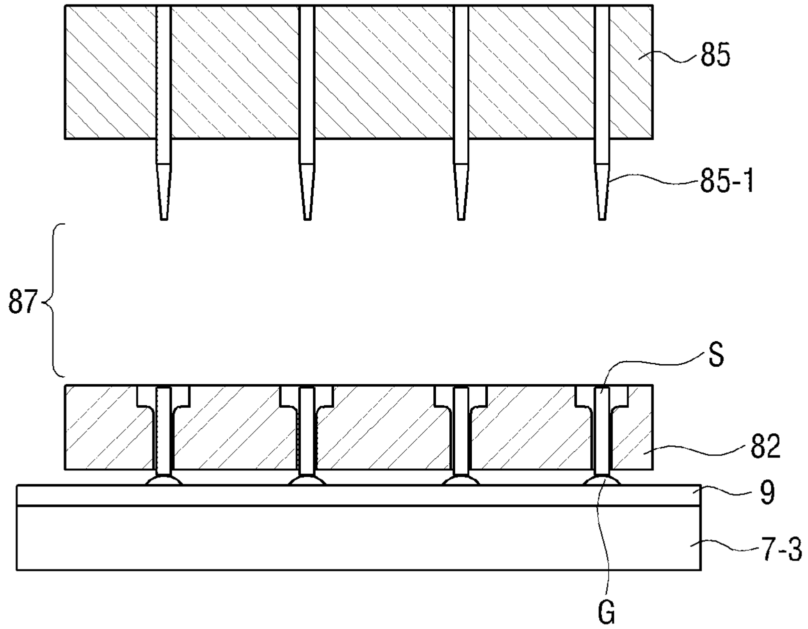
FIG. 31 is a partially sectional view conceptually illustrating a state in which a vacuum absorbing device is removed from a vacuum absorbing device receiving space of a guiding and pressing device.

After that, the controller 10 controls the first loader 91 so that the vacuum absorbing device 70 with the absorbed spacers S is placed in the vacuum absorbing device receiving space 87 of the guiding and pressing device 80. FIG. 28 conceptually illustrates a state in that the vacuum absorbing device 70 is placed in the vacuum absorbing device receiving space 87 of the guiding and pressing device 80. At this time, the spacers S absorbed by the vacuum absorbing device 70 are substantially aligned with the guiding holes 82-1 of the guiding plate 82 of the guiding and pressing device 80 in a straight line as illustrated in FIG. 28. Then, the vacuum absorbing device 70 moves down the absorbing plate 71 by a predetermined distance so that the top ends of the spacers S close to the guiding holes 82-1 of the guiding plate 82 as illustrated in FIG. 29. Thereafter, when the vacuum of the vacuum absorbing device 70 is off, the spacers S fall down by their own weight. The falling spacers S are guided by the guiding holes 82-1 of the guiding plate 82, and then, as illustrated in FIG. 30, contact in the vertical state the glue dots G sprayed on the panel 9 (S35). After that, the controller 10 controls the first loader 91 for the vacuum absorbing device 70 to get out of the vacuum absorbing device receiving space 87 of the guiding and pressing device 80. Then, as illustrated in FIG. 31, the vacuum absorbing device 70 is not between the pressing plate 85 and the guiding plate 82 of the guiding and pressing device 80.

Figure 32:
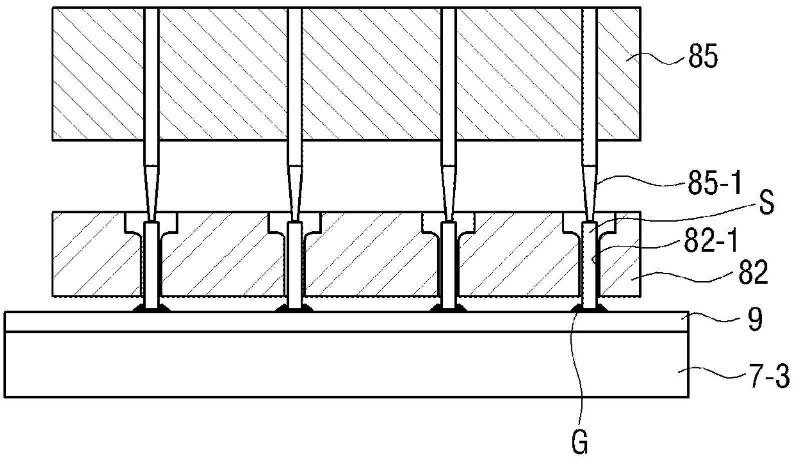
FIG. 32 is a partially sectional view conceptually illustrating a state in which a pressing plate moves down to press spacers against a panel.
Figure 33:
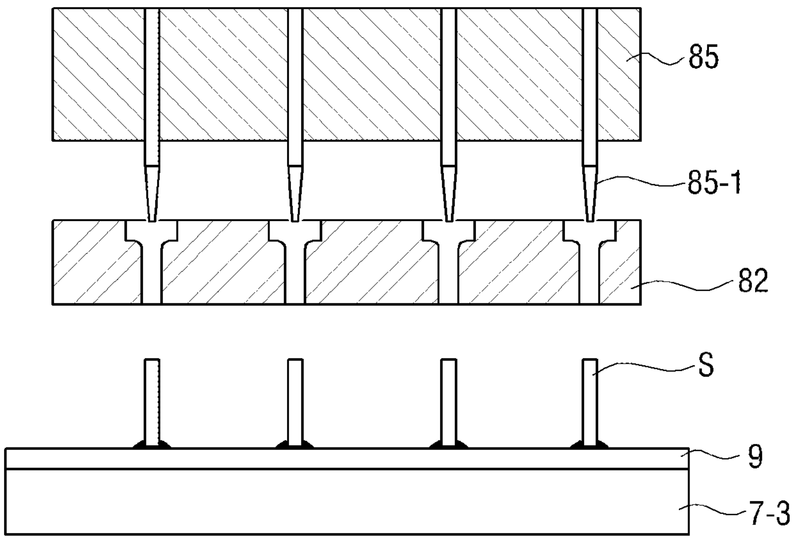
FIG. 33 is a partially sectional view conceptually illustrating a state in which a guiding and pressing device moves up from a panel.

After that, the controller 10 controls the pressing plate driving unit 86 for the pressing plate 85 to be moved down. Then, as illustrated in FIG. 32, the plurality of pressing pins 85-1 disposed on the bottom surface of the pressing plate 85 press the spacers S at a predetermined pressure (S37). By this operation, the spacers S sufficiently press the glue G sprayed on the panel 9 so that the spacers S are adhered substantially perpendicular to the panel 9.

After that, the controller 10 moves the pressing plate 85 and the guiding plate 82 of the guiding and pressing device 80 in an upward direction. Then, the spacers S, as illustrated in FIG.

33, are mounted on the panel 9 in the vertical state. Next, the controller 10 controls the second loader 92 for the guiding and pressing device 80 to be located above the second part 9-2 of the panel 9.

While the guiding and pressing device 80 presses the spacers S in the first part 9-1 of the panel 9, the first loader 91 moves the vacuum absorbing device 70 to the second region P2 of the vertical arraying pallet 50 and absorbs all the spacers S of the second region P2. The process in which the vacuum absorbing device 70 absorbs the plurality of spacers S is the same as the process in which the vacuum absorbing device 70 absorbs the spacers S of the first region P1 of the vertical arraying pallet 50; therefore, a detailed explanation thereof will be omitted.

By the first loader 91, the vacuum absorbing device 70 having absorbed the spacers S of the second region P2, is located in the vacuum absorbing device receiving space 87 of the guiding and pressing device 80 that is placed above the second part of the panel 9. Then, the vacuum absorbing device 70 breaks the vacuum for the spacers S to fall down, and the pressing plate 85 presses the spacers S. The operations of the vacuum absorbing device 70 and the guiding and pressing device 80 are the same as those of the vacuum absorbing device 70 and the guiding and pressing device 80 in the first part 9-1 of the panel 9 as described above; therefore, detailed descriptions thereof will be omitted.

After mounting the spacers S on the second part 9-2 of the panel 9 is completed, the controller 10 uses the first loader 91 and the second loader 92 to move the vacuum absorbing device 70 and the guiding and pressing device 80, thereby mounting the spacers S on the third part 9-3 of the panel 9. The process in which the spacers S are mounted on the third part 9-3 of the panel 9 is similar to the process in which the spacers S are mounted on the first and second parts 9-1 and 9-2 of the panel 9. Therefore, a detailed explanation thereof will be omitted. One example of the panel 9 on which the spacers S are mounted up to the third part 9-3 is illustrated in FIG. 34.

After mounting the spacers S on the third part 9-3 of the panel 9 is completed, the controller 10 unloads the panel 9 on which the spacers S are mounted outside through the glue dispensing apparatus 2 (S39).

As described above, with an automatic spacers mounting system according to an exemplary embodiment, since glue is directly sprayed on a panel, a process in which the glue is sprayed on the panel and a process in which spacers are mounted on the panel can be performed at the same time. Therefore, the automatic spacers mounting system according to the exemplary embodiments can reduce working time for mounting spacers compared to the related art automatic spacers mounting system that sprays glue the spacers and then mounts the spacers on a panel successively.

Also, with an automatic spacers mounting system according to an exemplary embodiment, a plurality of spacers, for example, all pieces of the spacers or at least ⅓ pieces of all spacers required to one panel can be mounted at the same time on the panel. Therefore, working time for mounting spacers on the panel may be reduced compared to the related art automatic spacers mounting system.

Also, with an automatic spacers mounting system according to an exemplary embodiment, if all pieces of spacers are divided into four groups and vertically arrayed in the vertical arraying pallet four times, the horizontal arraying pallet, posture changing pallet, posture changing shutter and open-close shutter may be formed to have a size of ¼ of the panel by using a shutter method. Therefore, since size of the parts can be reduced, manufacture of the parts may be easy and manufacturing cost may be reduced.

While the exemplary embodiments have been described, additional variations and modifications of the exemplary embodiments may occur to those skilled in the art once they learn of the basic inventive concepts. Therefore, it is intended that the appended claims shall be construed to include both the above embodiments and all such variations and modifications that fall within the spirit and scope of the inventive concept.

What is claimed is:

1. An automatic spacers mounting system, comprising:

a horizontal arraying device which arrays a plurality of spacers in a horizontal arraying pallet in a horizontal direction;

a vertical arraying device which comprises a vertical arraying pallet and a reversing device, wherein the reversing device vertically arrays the plurality of horizontally arrayed spacers into the vertical arraying pallet;

a mounting base to which the vertical arraying pallet and a panel on which glue is sprayed are fixed;

a vacuum absorbing device which absorbs, by a vacuum, the plurality of spacers vertically arrayed in the vertical arraying pallet fixed to the mounting base;

a guiding and pressing device which comprises a guiding plate which guides a plurality of spacers which fall from the vacuum absorbing device to the panel and a pressing plate which presses the plurality of spacers;

a first loader which is disposed on the mounting base and allows the vacuum absorbing device to move from the vertical arraying pallet to a first position above the panel;

a second loader which is disposed on the mounting base and allows the guiding and pressing device to move to a second position above the panel; and a controller which controls the vertical arraying device, the vacuum absorbing device, the guiding and pressing device, the first loader and the second loader to mount the plurality of spacers on the panel.

2. The automatic spacers mounting system of claim 1, further comprising:

a pallet loader which is disposed between the horizontal arraying device and the vertical arraying device and moves a gripper which grips the horizontal arraying pallet from the horizontal arraying device to the vertical arraying device.

3. The automatic spacers mounting system of claim 1, wherein the reversing device includes a posture changing pallet and an open-close shutter which are disposed in a layered manner, the reversing device couples the horizontal arraying pallet in a state that the posture changing pallet faces the horizontal arraying pallet, and the reversing device rotates by 180 degrees with the coupled horizontal arraying pallet.

4. The automatic spacers mounting system of claim 3, wherein the reversing device comprises a reversing frame in which the posture changing pallet and the open-close shutter are layered; and a rotating unit which rotates the reversing frame.

5. The automatic spacers mounting system of claim 4, wherein the reversing frame comprises pallet fixing portions which fix the horizontal arraying pallet to the posture changing pallet and a shutter driving portion which moves the open-close shutter with respect to the posture changing pallet.

6. The automatic spacers mounting system of claim 5, wherein the reversing frame further comprises:

a posture changing shutter which is disposed between the posture changing pallet and the horizontal arraying pallet; and a posture changing shutter driving portion which moves the posture changing shutter with respect to the posture changing pallet.

7. The automatic spacers mounting system of claim 3, wherein the posture changing pallet includes a plurality of posture changing holes, and wherein each of the posture changing holes include an inlet portion which corresponds to the spacer in a horizontal state, an outlet portion which corresponds to the spacer in a vertical state and a curve portion which connects the inlet portion and the outlet portion to guide the spacer from the horizontal state to the vertical state.

8. The automatic spacers mounting system of claim 7, wherein the open-close shutter includes a plurality of blocking portions formed to correspond to the outlet portions of the plurality of posture changing holes of the posture changing pallet and a plurality of through holes formed in a side of each of the plurality of blocking portions, the plurality of through holes through which the spacer discharged from the outlet portion passes, and wherein according to a signal from the controller, the blocking portion or the through hole is located below the outlet portion of the posture changing hole.

9. The automatic spacers mounting system of claim 1, further comprising:

a pallet carrying apparatus disposed between the horizontal arraying pallet and the mounting base and which carries the vertical arraying pallet to the vertical arraying device and the mounting base.

10. The automatic spacers mounting system of claim 1, wherein the vacuum absorbing device is formed to absorb, at a same time, several pieces of spacers among the plurality of spacers vertically arrayed in the vertical arraying pallet, and each of the plurality of pressing pins is formed as a spring pin.

11. The automatic spacers mounting system of claim 10, wherein the vacuum absorbing device absorbs, at a same time, ⅓ pieces of all spacers arrayed in the vertical arraying pallet.

12. The automatic spacers mounting system of claim 1, wherein the guiding and pressing device comprises a vacuum absorbing device receiving space in which the vacuum absorbing device is located above the guiding plate and below the pressing plate.

13. The automatic spacers mounting system of claim 1, wherein the horizontal arraying device is formed to allow the horizontal arraying pallet to perform a seesaw motion and to apply a vibration to the horizontal arraying pallet.

14. The automatic spacers mounting system of claim 1, wherein the horizontal arraying pallet includes a plurality of elongate grooves which correspond to a number of all spacers that will be mounted on the panel.

15. The automatic spacers mounting system of claim 1, further comprising:

a glue dispensing apparatus which is disposed in a side of the mounting base to spray glue at a plurality of positions of the panel on which the plurality of spacers will be mounted.

16. The automatic spacers mounting system of claim 15, wherein the glue dispensing apparatus comprises a panel centering unit which fixes the panel.

17. A method of automatically mounting spacers, comprising:

spraying glue at a plurality of positions of a panel on which a plurality of spacers will be mounted;

loading the panel with sprayed glue to a mounting base of a spacers mounting apparatus;

arraying the plurality of spacers in a horizontal arraying pallet in a horizontal direction using a horizontal arraying device;

coupling the horizontal arraying pallet to a reversing device and rotating the reversing device by 180 degrees so that the plurality of spacers is arrayed in a vertical direction;

moving the reversing device to a position above the vertical arraying pallet to drop the plurality of spacers into vertical grooves of the vertical arraying pallet;

loading the vertical arraying pallet to the mounting base;

placing the guiding and pressing device at a position above the panel loaded to the mounting base;

absorbing, by the vacuum absorbing device, the plurality of spacers in the vertical arraying pallet and placing the plurality of spacers in the vacuum absorbing device receiving portion of the guiding and pressing device;

dropping, by the vacuum absorbing device, the plurality of spacers into a plurality of guiding holes of the guiding and pressing device so that the spacers dropped in the plurality of guiding holes contact the glue of the panel;

removing the vacuum absorbing device from the vacuum absorbing device receiving space and moving the pressing plate to press the spacers inserted into the plurality of guiding holes; and unloading the panel after separating the guiding and pressing device from the panel.

18. The method of automatically mounting spacers of claim 17, wherein the spraying glue at a plurality of positions of a panel on which a plurality of spacers is mounted, and the arraying the plurality of spacers in a horizontal arraying pallet in a horizontal direction using a horizontal arraying device, are simultaneously performed.

19. The method of automatically mounting spacers of claim 17, wherein when the reversing device rotates the horizontally arraying pallet by 180 degrees, posture of each of the spacers is changed from a horizontal state to a vertical state while the spacers pass through a plurality of posture changing holes of the posture changing pallet.

20. The method of automatically mounting spacers of claim 17, wherein the moving the reversing device above the vertical arraying pallet comprises placing the reversing device in order from a first part to a fourth part among the four equal parts of the vertical arraying pallet.

21. The method of automatically mounting spacers of claim 17, wherein the placing the guiding and pressing device above the panel loaded to the mounting base comprises placing the guiding and pressing device in order from a first part to a third part among three equal parts of the panel.

* * * * *